US012647896B2

(12) United States Patent
    Zhang

(10) Patent No.: US 12,647,896 B2
(45) Date of Patent: Jun. 2, 2026

(54) POWER-SAVING NR (NEW RADIO) SIDELINK TRANSMISSION AND RECEPTION METHOD

(71) Applicant: Bo Zhang, Shanghai (CN)

(72) Inventor: Bo Zhang, Shanghai (CN)

( * ) Notice: Subject to any disclaimer, the term of this patent is extended or adjusted under 35 U.S.C. 154(b) by 359 days.

(21) Appl. No.: 18/254,380

(22) PCT Filed: Nov. 30, 2020

(86) PCT No.: PCT/CN2020/132623
    § 371 (c)(1),
    (2) Date: May 25, 2023

(87) PCT Pub. No.: WO2022/110103
    PCT Pub. Date: Jun. 2, 2022

(65) Prior Publication Data
    US 2024/0214940 A1      Jun. 27, 2024

(51) Int. Cl.
    *H04W 52/02*      (2009.01)
    *H04W 72/25*      (2023.01)
    *H04W 76/28*      (2018.01)
(52) U.S. Cl.
    CPC ....... *H04W 52/0274* (2013.01); *H04W 72/25* (2023.01); *H04W 76/28* (2018.02)
(58) Field of Classification Search
    CPC ......... H04W 52/0216; H04W 52/0229; H04W 52/0274; H04W 72/20; H04W 72/25; H04W 76/28
    See application file for complete search history.

(56) References Cited

U.S. PATENT DOCUMENTS

| 2019/0313374 A1 | 10/2019 | Lee et al. | |
| 2022/0110060 A1* | 4/2022 | Yang | H04W 72/02 |
| 2023/0180343 A1* | 6/2023 | Park | H04W 76/14 |

(Continued)

FOREIGN PATENT DOCUMENTS

| CN | 111600682 A | 8/2020 |
| CN | 111800244 A | 10/2020 |
| EP | 3128797 A1 | 2/2017 |

OTHER PUBLICATIONS

LG Electronics. "Discussion on physical layer design considering sidelink DRX operation" 3GPP TSG RAN WGJ #103-e RI-2007897, Nov. 13, 2020 (Nov. 13, 2020).

*Primary Examiner* — Pao Sinkantarakorn
(74) *Attorney, Agent, or Firm* — Hsuanyeh Law Group, PC

(57) ABSTRACT

The present application provides a power-saving NR side-link transmission and reception method, including: in DRX mode, Tx-UE transmitting initial TB within On-Duration, reserving periodic or non-periodic resources for the retransmission of the initial TB or transmission of other TBs, and configuring at least one first DRX timer if the number of periodic or non-periodic resources is less than or equal to N, where N is a natural number, the Tx-UE performing channel sensing in the slots of sensing windows and On-Duration, and configuring at least one second DRX timer, and Rx-UE waking up to receive initial TB and/or retransmission TB in the slots of all reserved periodic or non-periodic resources and/or On-Duration, where the reserved resources are located within On-Duration and/or Off-Duration. The present application solves the problems in DRX power saving in the prior art.

27 Claims, 6 Drawing Sheets

(56)                 References Cited

U.S. PATENT DOCUMENTS

| | | | |
|---|---|---|---|
| 2023/0247550 A1* | 8/2023 | Yu ......................... | H04W 72/02 |
| | | | 370/311 |
| 2023/0247718 A1* | 8/2023 | Ji ...................... | H04W 72/0446 |
| 2023/0370210 A1* | 11/2023 | Grieco .................. | H04L 1/1854 |
| 2023/0397292 A1* | 12/2023 | Park ..................... | H04L 1/1861 |
| 2023/0403681 A1* | 12/2023 | Wen .................. | H04W 52/0216 |

* cited by examiner

POWER-SAVING NR (NEW RADIO) SIDELINK TRANSMISSION AND RECEPTION METHOD

TECHNICAL FIELD

The present application relates to the technical field of radio communication, and in particular to a power-saving NR sidelink transmission and reception method.

BACKGROUND ART

Currently, the research and development of 5G (the 5th generation mobile communication system) is in full swing. According to future application requirements, the 5G system will use a brand-new new radio technology-NR (New Radio). Compared with LTE (Long Term Evolution), 5G NR needs to support higher data rate, larger transmission bandwidth and smaller transmission delay. Therefore, UE (User Equipment) supporting NR will inevitably consume a lot of power while using some advanced technologies to meet 5G requirements.

In order to save the power of UE, a DRX (Discontinuous Reception) mechanism is introduced, that is, when a terminal is in a connected state, it does not need to continuously monitor a control channel of a base station, but rather intermittently monitors the control channel. A DRX cycle includes a wake-up cycle and a sleep cycle, which are carried out through periodic repetition of On-Duration and Off-Duration. During On-Duration, the UE will turn on receiver's RF (radio frequency) for information reception, while during Off-Duration, the UE will turn off the receiver's RF for sleep. Usually, DRX On-Duration needs to be kept short enough and DRX Off-Duration needs to be kept long enough to minimize UE power consumption.

DRX parameters are configured by RRC (Radio Resource Control) and mainly include drx-onDurationTimer, drx-SlotOffset, drx-LongCycleStartOffset, drx-InactivityTimer, drx-ShortCycle and drx-ShortCycleTimer. By using these DRX parameters, a DRX process may be implemented in the case of RRC_CONNECTED, while in the case of RRC_IDLE/RRC_INACTIVE, a DRX Paging process is implemented. MAC entities are allowed to use DRX operations to detect PDCCH (Physical Downlink Control Channel) discontinuously, and use DRX MAC-CE instructions or long DRX MAC-CE instructions for control; otherwise, the MAC entities will continuously detect the PDCCH. In the case of RRC_IDLE/RRC_INACTIVE, the UE detects a paging occasion in each DRX cycle. Paging occasions are a set of PDCCH detection occasions, including a plurality of slots (such as subframes or OFDM symbols) in which paging DCI (Downlink Control Information) is sent.

NR-DRX in the existing Uu link is only used for unicast transmission, while future NR sidelink DRX will be used for broadcast, groupcast and unicast transmission within and outside a coverage range. If power saving UE (such as P-UE or Pedestrian UE) is within the coverage range, similar processes in the NR-DRX cycle of the Uu link may be used, and all RRC parameters and corresponding sidelink DRX operations may be controlled by network. However, if the power saving UE is not within the coverage range, all RRC parameters of the sidelink DRX cycle may depend on a pre-configured mode. For various services of sidelinks, if an NR-DRX mechanism in the Uu link is used, dynamic control of DRX cycle in the sidelink DRX process needs great improvement.

Therefore, the on/Off-Duration of the DRX cycle in Uu and the corresponding UE process may be taken as the basis of sidelink DRX. At the same time, the sidelink DRX mechanism has to consider the impact of different transmission types (broadcast, groupcast and unicast) for situations within and outside the coverage range.

HARQ (Hybrid Automatic Repeat Request) is a combination of FEC (Forward Error Correction) and ARQ (Automatic Repeat Request) error control. Under harsh signal conditions, HARQ performs better than ordinary ARQ, but the reception performance is improved at the cost of reducing throughput.

In DRX operations, if Rx-UE (Receiver UE) correctly decodes the PDCCH but incorrectly decodes the PDSCH (Physical Downlink Shared Channel), the Rx-UE uses drx-HARQ-RTT-Timer and drx-RetransmissionTimer to control the corresponding HARQ process. Since the Rx-UE does not know the occasion of packet retransmission, it has to continuously detect the PDCCH in order to receive and decode the PDSCH associated with the same HARQ process ID. For the HARQ process on the DL (Down Link), if the UE has already received new data on the PDSCH, the UE starts the HARQ RTT timer after DL HARQ feedback ends. If the corresponding packet is not successfully decoded at the end of the drx-HARQ-RTT-TimerDL timing, the UE will start the timer drx-RetransmissionTimerDL. When the timer drx-RetransmissionTimerDL runs, the UE needs to detect the PDCCH of the HARQ process, as during this period, the UE will probably perform packet retransmission.

Candidate single slot (i.e. Slot) resource $R_{x,y}$ is defined as $L_{subCH}$ continuous subchannels within time interval $[n+T_1, n+T_2]$, where $T_1$ depends on $$0 \le T_1 \le T_{proc,1}^{SL},$$

$T_2$ depends on $T_{2\ min}$, and is implemented by the UE itself. Attention, if $T_{2\ min} \le T_2 \le$ Remaining PDB (Remaining Packet Delay Budget); if $T_{2\ min} >$ Remaining PDB, then set $T_{2\ min} =$ Remaining PDB. Sensing window is defined by slot range $[n-T_0, n-T_{proc,\ 0})$, where $T_0$ and $$T_{proc,0}^{SL}$$

are represented by slots. If the candidate single slot resource $R_{x,y}$ is subjected to reservation or pre-emption by another UE, the UE has to exclude the candidate single slot resource. If the number of remaining candidate single slot resources in the set $S_A$ is less than $X \cdot M_{total}$, the priority value $Th(p_i)$ is added by 3 dB, and the same resource selection process is continued to repeat (for example, X=20%).

In Rel-16, Tx UE (Transmitter UE) senses a sidelink channel in the sensing window and calculates the channel resource reservation condition. The size of the sensing window is determined by the type of traffic (periodic and non-periodic); and the periodic traffic window is 1100 ms, and the non-periodic traffic window is 100 ms. The Tx-UE determines the resources that are supposed to be excluded in a selection window based on the sensed sidelink channel. Two types of resources have to be excluded: one is reserved periodic resources, and the other is resources reserved by the SCI (Sidelink Control Information) within 32 slot windows. The exclusion process is performed by the Tx-UE based on the comparison of RSRP (Reference Signals Received Power). Finally, the Tx-UE correspondingly selects transmission and reservation resources from all remaining candidate resources. In addition, the Tx-UE may also perform re-evaluation and pre-emption mechanisms to avoid resource conflicts. In Rel-16 NR-V2X, SCI has the reserved interval capacity of 32 slots. Once exceeding this range, the Tx-UE is only able to reserve periodic resources by using the optional SCI parameter ResourceReservePeriod.

Therefore, in On-Duration and Off-Duration of DRX, it is necessary to consider how to control transmission and reception issues of sidelinks, as well as how to adjust the sidelink DRX modemode for different UEs, in order to overcome the deficiencies of the prior art in DRX power saving.

SUMMARY

The present invention aims to provide a power-saving NR sidelink transmission and reception method, in order to solve the problems about DRX based UE reception and partial sensing based transmission.

Technical terms involved:

DRX (Discontinuous Reception);

UE (User Equipment);

TB (Transport Block) or packet;

Tx-UE (Transmitter UE), used for sending TBs to other UE through unicast, groupcast or broadcast;

Rx-UE (Receiver UE);

On-Duration;

Off-Duration;

PSCCH (Physical Sidelink Control Channel);

PSSCH (Physical Sidelink Shared Channel);

PSFCH (Physical Sidelink Feedback Channel);

PDCCH (Physical Downlink Control Channel);

PDSCH (Physical Downlink Shared Channel);

PUSCH (Physical Uplink Shared Channel);

DCI (Downlink Control Information);

SCI (Sidelink Control Information);

DL (Down Link);

Power Saving UE (for example, P-UE or Pedestrian-UE);

PRR (Packet Reception Ratio);

HARQ (Hybrid Automatic Repeat reQuest);

RSRP (Reference Signal Receiving Power), one of the key parameters that may represent the wireless signal strength in LTE networks and one of the physical layer measurement requirements, the average signal power received on all RE (resource elements) carrying the reference signals within a certain symbol;

PDB (Packet Delay Budget);

MAC-CE (MAC Control Element).

To achieve the above purpose, the invention uses the following technical solutions:

A power-saving NR sidelink transmission and reception method, including:

In a DRX modemode, Tx-UE transmitting initial TB in On-Duration and reserving periodic or non-periodic resources for retransmission of the initial TB or transmission of other TBs associated with the initial TB by using SCI format, if the number of the periodic or non-periodic resources is less than or equal to N, and N is a natural number, then configuring at least one first DRX timer, based on the first DRX timer, the Tx-UE performing channel sensing in the slot of a sensing window and all On-Duration slots, and Configuring at least one second DRX timer, based on second DRX timer, Rx-UE entering a wake-up state to receive the initial TB in related slots of all reserved periodic or non-periodic resources and/or all On-Duration slots, where, the reserved periodic or non-periodic resources are indicated by SCI and located at On-Duration and/or Off-Duration.

Preferably, Tx-UE may belong to power-saving UE (such as Vulnerable Road Users in V2X use cases, referred to as VRUs, or users in public safety and commercial use cases), or may belong to ordinary UE (such as vehicle UE); and Rx-UE only belongs to power-saving UE.

Preferably, in sidelink DRX, transmission types of Tx-UE include unicast, groupcast or broadcast.

Preferably, there are two types of DRX timers; for one type, when the DRX timer runs (including drx-ReservePeriodTimer, drx-ReserveInstantTimer, drx-HARQ-RTT-Timer, drx-OffDurationTimer, drx-CommonOffDurationTimer and drx-SpecificOffDurationTimer), Rx-UE stops receiving and closes its RF chain; for the other type, when the DRX timer runs (including drx-OnDurationTimer, drx-CommonOnDurationTimer, drx-SpecificOnDurationTimer and drx-RetransmissionTimer), the Rx-UE begins reception and opens its RF chain.

Preferably, operation of sidelink DRX supports extended On-Duration, at Off-Duration initial TB or retransmission TB of sidelinks may also be transmitted and received.

Preferably, in response to received DRX configuration parameters, Rx-UE enters an active state and monitors PSCCH and/or PSSCH.

Preferably, Rx-UE detects initial TB in On-Duration, and PSCCH corresponding to the initial TB indicates the slot of reserved resources for retransmission TB; the Rx-UE determines the state of the DRX timer based on the slot of the resources reserved by the PSCCH, where the Rx-UE stops detecting the PSCCH within the running time of the DRX timer.

Preferably, if initial TB is not the first TB at the beginning of service, Tx-UE does not need to send the TB in On-Duration, as long as SCI reserves resources for the initial TB in the previous TB.

Preferably, PSCCH corresponding to initial TB and/or retransmission TB indicates the slot of reserved resources of the next retransmission TB until delay budget is reached or Rx-UE performs successful decoding.

Preferably, the first DRX timer is a timer used for sensing, including drx-PeriodSensingTimer and drx-SensingTimer; the second DRX timer is a timer used for packet reception, including one or more of drx-OnDurationTimer, drx-CommonOnDurationTimer, drx-SpecificOnDurationTimer, drx-OffDurationTimer, drx-CommonOffDurationTimer, drx-SpecificOffDurationTimer, drx-ReservePeriodTimer, drx-ReserveInstantTimer, drx-HARQ-RTT Timer and drx RetransmissionTimer.

Preferably, DRX includes two types of active time: packet reception active time and sensing active time; where at the packet reception active time, Rx-UE decodes PSCCH and PSSCH, and at the sensing active time, Tx-UE only decodes the PSCCH.

More preferably, when a DRX cycle is configured, the packet reception active time includes: the slot of reserved resources in the previous transmission; or, including any of the following timers running:

drx-CommonOnDurationTimer, drx-SpecificOnDurationTimer, drx-onDurationTimer and drx-RetransmissionTimer.

5

6

More preferably, when DRX cycle is configured, the sensing active time includes: the slot for Tx-UE to receive within the sensing active time; or, including any of the following timers running:

drx-PeriodSensingTimer, drx-SensingTimer, drx-onDurationTimer, drx-CommonOnDurationTimer and drx-SpecificOnDurationTimer.

Preferably, Tx-UE transmits the first initial TB at the beginning of service in On-Duration and reserves the periodic resources for different initial TBs by using SCI format; Rx-UE enters a wake-up state during On-Duration slot to receive the initial TBs, and infers the information of the reserved periodic resources through ResourceReservePeriod, where the ResourceReservePeriod is selectively configured in the SCI; the timer drx-ReservePeriodTimer=ResourceReservePeriod is set as the active time of the Rx-UE, and the Rx-UE also receives different initial TBs in the relevant slots of all reserved periodic resources.

More preferably, if drx-ReservePeriodTimer and drx-onDurationTimer are superposed, Rx-UE prioritizes the On-Duration timer.

More preferably, if drx-ReservePeriodTimer and other reserved resource slots are superposed, Rx-UE prioritizes detecting the reserved resource slots.

Preferably, if Tx-UE transmits first initial TB at the beginning of service in On-Duration and the transmission interval between adjacent TBs is less than 32 slots, the transmitted resources are continuously reserved for the next TB by SCI associated with each TB; Rx-UE sets the timer drx-ReserveInstantTimer as an active time, only monitoring On-Duration slots and related slots of all reserved resources.

Preferably, if Tx-UE transmits the first initial TB at the beginning of service in On-Duration and the transmission interval between adjacent TBs is greater than 32 slots, the Tx-UE uses SCI format without reserving any resources for transmission; Rx-UE only enters the wake-up state during the On-Duration slot to receive the initial TBs.

Preferably, if Rx-UE accesses a gNB network, before the gNB instructs the Rx-UE or grants the Rx-UE PDSCH or PUSCH resources through PDCCH, the Rx-UE maintains the detection of the PDCCH within On-Duration in DRX mode.

Preferably, if the traffic on the sidelink channel is very small, the number of slots configured in On-Duration is reduced to one.

Preferably, DRX mode includes common DRX mode, also known as default DRX mode, and Tx-UE selects the common DRX mode to send the initial TB; where the common DRX mode is configured to have long DRX cycles and short On-Duration, within each long DRX cycle, power-saving UE starts the timer drx-CommonOnDurationTimer after drx-CommonSlotOffset; when satisfying the condition as:

$$[(DFN \times 10) + Slot\text{-}Number(n)] \mod(drx\text{-}Common\text{-}Cycle) = drx\text{-}CommonStartOffse,$$

the power-saving UE enters the wake-up state and receives PSCCH; where DFN (Direct Frame Number) is the direct frame number (which may be obtained within and outside the coverage range) provided by GNSS, drx-CommonCycle is the cycle of the common DRX, Slot-Number(n) is the current slot with the index of n, n is a natural number, and drx-CommonStartOffset is DRX common offset slot. More preferably, common DRX mode is configured so that all slots are able to be detected by power-saving UE and is applicable to all transmission types (unicast, groupcast or broadcast).

More preferably, in the above formula, DFN may be replaced by SFN (System Frame Number). However, SFN is only effective within the coverage range of cellular networks. In order to effectively reduce power consumption, short On-Duration should be maintained as much as possible.

More preferably, in common DRX mode, Tx-UE uses blind retransmission for transmission in On-Duration, i.e., one initial TB and at least one retransmission TB, and/or the Tx-UE uses retransmission based on an HARQ mechanism for transmission in Off-Duration.

In the above, blind retransmission in On-Duration may ensure that Rx-UE successfully receives SCI, so as to maintain a resource reservation chain between two adjacent reserved resources.

Furthermore, in On-Duration, Tx-UE ignores FCI (feedback control information) fed back by Rx-UE, and realize the goal of blind retransmission.

In the above, in order to maintain backward compatibility with UE of Rel-16, PSCCH/PSSCH resources with dedicated PSFCH resources need to be configured in each resource pool for retransmission based on an HARQ mechanism. In this case, Tx-UE of Rel-17 is still able to transmit the initial TB and retransmission TB in On-Duration, but the Tx-UE needs to change its behavior towards the HARQ mechanism; that is, only ignoring the FCI information fed back by Rx-UE in On-Duration, in other words, regardless of whether ACK or NAK is received, the Tx-UE has to complete all retransmissions in On-Duration, however in Off-Duration, the Tx-UE still needs to follow the HARQ mechanism of Rel-16 and performs the retransmission based on the HARQ mechanism.

Furthermore, PSCCH/PSSCH resources without dedicated PSFCH resources are configured in On-Duration for blind retransmission, and PSCCH/PSSCH resources with dedicated PSFCH resources are configured in Off-Duration for retransmission based on an HARQ mechanism.

Furthermore, in On-Duration, an MAC layer notifies a PHY layer of the resource slot range included in On-Duration when reporting candidate resources, or the PHY layer is informed of specific configuration of DRX in advance to ensure that there are sufficient candidate resources in On-Duration.

Furthermore, in On-Duration, an MAC layer selects favorable resources for initial TB to complete the transmission and blind retransmission of the initial TB by optimizing a resource selection method. The optimization of the resource selection method includes at least one of the follows: increasing the priority of the initial TB; or increasing the code rate of PSCCH corresponding to the initial TB transmission.

In the above, in order to improve the PSCCH code rate for initial TB transmission in On-Duration, RRC includes two PSCCH configurations: one is On-Duration related PSCCH configuration with higher code rate, and the other is Off-Duration related PSCCH configuration with code rate equivalent to Rel-16.

More preferably, DRX mode also includes specific DRX mode for specific services, which is configured with short DRX cycle, and in each specific DRX configuration, DRX parameters associated with the QoS of short PDB are (pre)configured; where On-Duration only contains very few slots (at least one slot), and the DRX cycle is smaller than the short PDB.

Furthermore, UE may use specific DRX mode on the basis of common DRX mode and switch between the common DRX mode and the specific DRX mode based on the specific service requirements.

Furthermore, switching between the common DRX mode and the specific DRX mode includes: receiving control signals from MAC-CE or SCI to switch between the common DRX mode and the specific DRX mode; and when a specific service expires and relevant packets are no longer transmitted, the specific DRX mode ceases to be used, and UE returns to the common DRX mode.

Preferably, if Tx-UE reserves non-periodic resources, and Rx-UE correctly detects SCI from received PSCCH but has no reserved resources or fails to detect the required SCI related to TB retransmission, the Rx-UE starts the timer drx-RetransmissionTimer, is woken up at each slot and detects PSCCH decoding until the timer drx-RetransmissionTimer expires, or the Rx-UE receives the retransmitted SCI; afterwards, the Rx-UE enters a normal power-saving reception mode, where the power-saving reception mode means that the Rx-UE only enters the wake-up mode in the slots of On-Duration and reserved resources for receiving PSCCH as well as decoding and receiving TB associated with the UE.

More preferably, if the resource re-evaluation and/or the pre-emption mechanisms are enabled in a resource pool, Rx-UE starts the timer drx-HARQ-RTT-Timer after receiving the initial TB and not successfully decoding a TB. After NAK feedback, the Rx-UE indirectly starts the timer drx-RetransmissionTimer, the drx-HARQ-RTT-Timer is determined by the status of the PSFCH resource associated with the authorized retransmission More preferably, if the resource re-evaluation and/or the pre-emption mechanisms are enabled in the resource pool, Tx-UE is prohibited to reselect resources before the slots of the reserved resources, and the Tx-UE preferably selects the resources that are closer to the slots of the reserved resources as reselected resources.

More preferably, if Tx-UE uses a retransmission based on an HARQ mechanism for transmission in Off-Duration, an HARQ process uses HARQ Option-2 and Rx-UE fails to detect PSCCH related to initial TB, then the Tx-UE retransmits a TB in the same On-Duration or retransmits the TB in the next upcoming On-Duration within delay budget.

Preferably, if Tx-UE reserves periodic resources and a resource reservation chain is lost due to continuous resource conflicts and triggering of resource reselection by the Tx-UE, then the Tx-UE is configured to reselect resources only during On-Duration, and Rx-UE enters the wake-up state only during On-Duration and the relevant slots of the reserved periodic resources to receive the initial TB or the retransmitted TB.

In the above, once performing TB reception in On-Duration, Rx-UE may detect whether the resources have been reselected. This requires an MAC entity of Tx-UE to use a DRX cycle as counting unit to determine whether the resources need to be reselected, rather than counting the TB transmission number as used in Rel-16.

More preferably, if the resource re-evaluation and/or the pre-emption mechanisms are enabled in the resource pools, then the resource re-evaluation and/or the pre-emption mechanisms are disabled by using sl-PreeptionEnable in the (pre)configured resource pools.

Preferably, if Tx-UE reserves periodic resources and a resource reservation chain is lost due to continuous resource conflicts and triggering of resource reselection by the Tx-UE, Rx-UE starts the timer drx-ReceivePeriodTimer, where drx-ReceivePeriodTimer=ResourceReservePeriod, the Rx-UE is woken up at each slot and detects PSCCH decoding until the timer drx-ReceivePeriodTimer expires, or, the Rx-UE detects PSCCH related to the reserved periodic resources again; afterwards, the Rx-UE enters the normal power-saving reception mode, which means that the Rx-UE only enters the wake-up mode in the slots of On-Duration and the reserved resources for receiving PSCCH as well as decoding and receiving the TB associated with the UE.

More preferably, before a resource reservation chain is lost, Tx-UE adopts any of the following ways to prevent periodic resources reserved by the Tx-UE from being pre-empted by another Tx-UE, including:

Increasing the priority of initial TB; or

Prohibiting the Tx-UE to reselect resources before reserved resource slots; or

Notifying Rx-UE in advance through SCI or MAC-CE of reselection of periodic resources in next transmission.

In the above, once Rx-UE starts the timer drx-ReceivePeriodTimer, then the resource reselection may be executed in On-Duration or not in On-Duration.

Preferably, the method further includes: for periodic resources reserved by the first Tx-UE, the second Tx-UE adopts a partial sensing mechanism to perform channel sensing, and provides the sensing results to an MAC layer for resource (re)selection. The partial sensing mechanism includes:

The second Tx-UE enters the wake-up state in each slot of the periodic resources reserved by the first Tx-UE to sense SCI on PSCCH; when SCI detection fails, the second Tx-UE starts the timer drx-PeriodSensing-Timer, wakes up and detects the PSCCH in each slot until the timer drx-PeriodSensingTimer expires, or until the second Tx-UE successfully detects the PSCCH in a new slot;

where the first Tx-UE and the second Tx-UE are different Tx-UEs.

More preferably, the timer drx-PeriodSensingTimer in a partial sensing mechanism is equal to the ResourceReservePeriod required by QoS in a specific service.

More preferably, in a partial sensing mechanism, the first Tx-UE is prohibited to select the resources prior to the reserved periodic resources as the reselected resources.

Preferably, the method further includes: in each resource pool, at least two first Tx-UEs with different periodicity and/or different transmission time offsets have reserved periodic resources, and the second Tx-UE is only woken up in different sensing clusters to perform channel sensing related to the UE, and the sensing clusters are configured as superposition slots or neighbor slots of the periodic resources reserved by at least two different first Tx-UE, where the first Tx-UE and the second Tx-UE are different Tx-UEs.

More preferably, different sensing clusters include sensing clusters close to On-Durations and far from On-Durations in Off-Durations, and the second Tx-UE is only woken up in sensing clusters far from On-Duration to perform channel sensing related to the UE.

More preferably, value of $Th(prio_{RX}, prio_{TX})$ is used for configuring a threshold, and the second Tx-UE compares the received RSRP with the threshold, excludes reserved resources that do not fall within the threshold range, and performs subsequent transmission resource selection from remaining reserved resources; where $prio_{RX}$ is the priority used to receive the packets, and $prio_{TX}$ is the priority used to transmit the packets.

Preferably, the method further includes: when Tx-UE reserves periodic resources, sensing UEs establish specific sensing cycles with $T_{cycle}$ slots, each specific sensing cycle is configured to have L partial sensing windows with the length of $T_W$, and the position of each partial sensing window is determined by the sensing UE or configured by RRC using window offset $\Delta_{W,l}$ in each resource pool, and the sensing UEs are woken up in the partial sensing windows and sense PSCCH of all slots; where $T_W$ is the cycle length of the partial sensing windows and satisfies $T_{MIN} \leq T_W \leq T_{MAX}$, $T_{MIN}$ and $T_{MAX}$ are the minimum and maximum cycle lengths configured in the current resource pool respectively, L is the number of the partial sensing windows, L=1, 2, . . ., $\lfloor T_{cycle}/T_{MAX} \rfloor$ and $T_{MAX} \ll T_{cycle}$, l=1, 2, . . . , L.

More preferably, the size of partial sensing windows may be adaptively adjusted according to current traffic in transmission in current resource pool.

More preferably, if L>1, size of partial sensing windows in a specific sensing cycle may be different, which is also determined by sensing UEs.

More preferably, one or more of the following information may be obtained by sensing partial sensing windows:

The number of traffic cycles in transmission in current resource pool and corresponding cycle length; and The time offset of periodic resources between Tx-UEs and sensing UEs.

More preferably, based on channel conditions, whether to perform sensing in partial sensing windows depends on the implementation of UE. For example, if the number of NAKs received is greater than a set threshold, sensing UEs may activate TW of a part or all of partial sensing windows within specific sensing cycles.

More preferably, based on the sensed long-period reserved resource quantity (or occurrence frequency), second Tx-UE may adjust the size of TW of the partial sensing windows according to a preset threshold.

More preferably, relationship between $T_W$ and a threshold may be (pre)configured by RRC; where the number of cycles and corresponding cycle lengths in the resource pool are M and Nm respectively, and m=1, 2, . . . , M; the threshold for the number of long-period reserved resources may be (pre)configured as THm, while Nm and THm correspond to each other; sensing UEs may determine $T_W$ by comparing the number of reserved resources in the sensing long period and THm.

In a preferred embodiment, if a minimum sensing window (such as $T_{MAX}$) is configured in each resource pool, sensing clusters may be used as partial sensing windows, and setting of the partial sensing windows does not require any limitation of sensing cycles.

More preferably, a specific sensing cycle may be configured for use by a plurality of resource pools, and $T_W$-long partial sensing windows may be determined by the minimum and maximum cycle lengths configured in the plurality of resource pools.

Preferably, the method further includes: for reserved non-periodic resources, Tx-UE performs channel sensing in one or a combination of more of the following ways:

Second partial sensing mechanism, including: after TB arrives, Tx-UE starting the timer drx-SensingTimer, conducting channel sensing in the first 31 slots before On-Duration in DRX mode for subsequent resource selection, and then Tx-UE continuing sensing until initial TB or retransmission TB is successfully received or the timer drx-SensingTimer expires;

Full Sensing mechanism, including: if PDB is less than 32 slots, Tx-UE not closing the sensing sidelink RF, starting sensing before 32 slots of the first On-Duration after the first TB arrives, and stopping sensing in the slot where the last TB is successfully transmitted;

Random resource selection mechanism, including: for Tx-UE with high power saving requirements, the Tx-UE reporting all candidate resources within selection windows to MAC, without including the resource exclusion process.

In the above, in Rel-17, one or a combination of more of the full sensing mechanism, the partial sensing mechanism and the random resource selection mechanism may be used to (pre)configure a sidelink transmission resource pool to have packet transmission.

In the above, the periodic partial sensing mechanism and the non-periodic partial sensing mechanism may be used simultaneously, because the Tx-UE may have periodic and/or non-periodic traffic, and sensing UEs have to simultaneously capture and infer reserved resource information for both types of traffic.

In the above, the resource pool is configured by SL-ResourcePool, where periodicity of the packets is configured by selecting the periodic list sl-ResourceReservePeriodList. At this time, periodic and non-periodic traffic may be transmitted simultaneously in one resource pool, and periodic and non-periodic partial sensing mechanisms have to be considered at the same time; otherwise, UE is only able to transmit non-periodic packets, and in this case, a sensing process relies on the non-periodic partial sensing mechanism.

The present application provides a power-saving NR sidelink transmission and reception method, which solves the problem of how to control sidelink transmission and reception in on-duration and off-duration of DRX, as well as the problem of transmission based on partial sensing, and overcomes the shortcomings of DRX power saving in the prior art.

BRIEF DESCRIPTION OF DRAWINGS

The drawings, which form a part of the application, are used to provide a further understanding of the application, and the illustrative embodiments and descriptions of the application are used to explain the application, and do not constitute undue restrictions on the application. In the drawings.

DETAILED DESCRIPTION OF THE EMBODIMENTS

Figure 1:
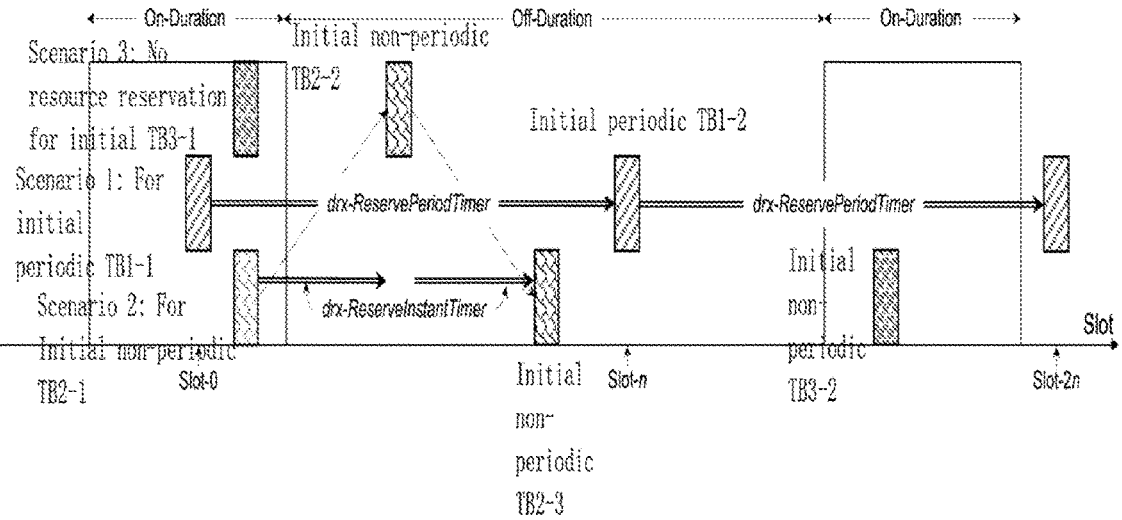
FIG. 1 is an example diagram of TB transmission and reception for Scenario 1, Scenario 2, and Scenario 3 in Embodiment 1.

In the following, Tx-UE may belong to power-saving UE (such as Vulnerable Road Users in V2X use cases, referred to as VRU, or users in public safety and commercial use cases), or may belong to ordinary UE (such as vehicle UE); But Rx-UE only belongs to power-saving UE. It is worth noting that only power-saving UE requires saving power consumption of UE.

In the following, DRX includes two types of active time: one is packet reception active time and the other is sensing active time. At the previous packet reception active time, UE is supposed to decode PSCCH and PSSCH, while at the sensing active time, the UE only needs to decode the PSCCH.

In sidelink DRX, timers for packet reception are introduced, including drx-onDurationTimer, drx-CommonOnDurationTimer, drx-SpecificOnDurationTimer, drx-CommonOffDurationTimer, drx-SpecificOffDurationTimer, drx-ReservePeriodTimer, drx-ReserveInstantTimer, drx-HARQ-RTT Timer and drx-RetransmissionTimer. When a sidelink DRX cycle is configured, the packet reception active time includes:

slot of reserved resources in last transmission; or any of the following timers running: drx-CommonOnDurationTimer, drx-SpecificOnDurationTimer, drx-onDurationTimer and drx-RetransmissionTimer.

In the side link DRX, timers for partial sensing are introduced, including drx-PeriodSensingTimer and drx-SensingTimer. When the sidelink DRX cycle is configured, sensing active time for partial sensing includes:

slot for UE to receive during partial sensing active time; or any of the following timers running: drx-PeriodSensingTimer, drx-SensingTimer, drx-onDurationTimer, drx-CommonOnDurationTimer and drx-SpecificOnDurationTimer.

Embodiment 1

This embodiment solves the problem of how Tx-UE initially transmits/retransmits (Retransmission referred to as Re-Tx) TB (Transport Block), as well as how Rx-UE receives initial TB and retransmission TB.

In NR-V2X, Tx-UE uses PSCCH (Physical Sidelink Control Channel) to send SCI (Sidelink Control Information) in format 1-A (1st Stage) in slot n, and then uses associated PSSCH (Physical Sidelink Shared Channel) to send packets in the same slot. The PSCCH is able to indicate resources for initial transmission of TB based on sensing and resource selection processes, and reserve resources for its retransmission; and the maximum number of reserved resources is two. Tx-UE may choose periodicity among 0 ms, 1 ms~99 ms, 100 ms, 200 ms, . . . , 1000 ms based on service type. The PSCCH selectively utilizes the "resource reservation period" to reserve periodic resources for periodic packets during initial transmission of TB. Optionally, the PSCCH may also use SCI to reserve initial transmission resources for TBs associated with different TBs.

In side chain DRX, once the Tx-UE starts its specific service, regardless of the transmission type (i.e. unicast, groupcast or broadcast), the Tx-UE has to ensure the transmission of the first TB (or initial TB) in On-Duration. This is because the DRX mode has to ensure mutual alignment between the Tx-UE and the Rx-UE in terms of transmission/reception. Only in On-Duration can the Rx-UE that is interested in service be sure to receive the sent TB.

In addition, due to the need for Tx-UE to ensure that the packets are accurately received by the Rx-UE in On-Duration, enhancement is necessary in terms of transmission. For example, blind retransmission is used for transmission in On-Duration, which may improve the packet receiving probability. Furthermore, when selecting transmitting resources, the Tx-UE has to ensure that the transmitting resources are in the On-Duration range.

It is worth noting that once the Tx-UE starts its specific service, the first TB might be high-level control information or service data information. In order to achieve power saving of the sidelink DRX, three scenarios are taken into consideration for transmission (retransmission)/reception, as shown in FIG. 1.

Scenario 1

In Scenario 1, reserve periodic resources using SCI format 1-A. Tx-UE may reserve periodic resources without considering whether the resource is in On-Duration or Off Duration. If Tx-UE starts its corresponding service, the first TB associated with it is supposed to be sent during the On-Duration period.

Once Tx-UE starts its corresponding service, Rx-UE will obtain first TB during On-Duration, and then the Rx-UE may infer reserved and periodic related resource information through ResourceReservePeriod. ResourceReservePeriod may be selectively configured in SCI. By setting the timer drx-ReservePeriodTimer=ResourceReservePeriod as the active time of UE, the Rx-UE only needs to detect slots related to reserved resources. This means that once the timer runs, the Rx-UE will stop reception and close its RF chain. It is worth noting that if drx-ReservePeriodTimer and drx-onDurationTimer are superposed, Rx-UE has to prioritize the timing of On-Duration. If drx-ReservePeriodTimer and other reserved resource slots are superposed, the Rx-UE prioritizes detecting the reserved resource slots.

Scenario 2

In Scenario 2, SCI format 1-A may reserve resources for initial transmission of other TBs. Similarly, Tx-UE starts its corresponding service, and as long as the first TB is transmitted during On-Duration, the Tx-UE may reserve resources without considering whether the resources are in On-Duration or Off-Duration. If the interval between packets is less than 32 slots, transmission resources may be continuously reserved by the SCI associated with one TB for the next TB.

In this case, Rx-UE will use the timer drx ReserveInstant-Timer, and the Rx-UE only needs to detect the relevant slots of the reserved resources indicated by SCI. This means that once the timer runs, the Rx-UE will stop reception and close its RF chain.

As a use case for big data packets, a big data packet might be divided into a plurality of TBs, so the interval between two TBs might be very short. Each TB has to be sent at short intervals to meet the overall delay requirement of the big data packet.

Scenario 3

In Scenario 3, SCI format 1-A does not retain any resources. This usually occurs when providing services for non-periodic traffic, where the transmission interval between two initial TBs is greater than 32 slots. In this case, Tx-UE has to select resources in On-Duration to ensure that Rx-UE interested in service is able to receive packets during On-Duration. Therefore, the Rx-UE only needs to detect all slots in On-Duration.

If Rx-UE is able to access a gNB network, Rx-UE does not know the timing of its reception or transmission before gNB instructs or grants PDSCH or PUSCH (Physical Uplink Shared Channel) resources to the Rx-UE through PDCCH. Therefore, if DRX is (pre)configured, UE has to maintain or maintain detection of PDCCH during DRX On-Duration.

However, in NR-V2X, there is a fundamental difference between PSCCH reception or transmission and PDSCH reception or transmission. In initial transmission, the SCI on PSCCH not only indicates the resources used for the initial transmission, but also reserves retransmission resources for the same TB, with a maximum of two reserved resources. If the resources selected for initial transmission and retransmission are all limited to the DRX On-Duration range, DRX On-Duration is unable to be configured to be shorter than 32 slots. This will result in significant power consumption. Therefore, UE is supposed to allow for active time during sidelink DRX Off-Duration. For example, like Uu DRX operation, sidelink DRX operation is supposed to support extended On-Duration, and may also transmit and receive initial or retransmitted packets from the sidelinks during Off-Duration.

Specifically, Tx-UE allows for the transmission of initial TB during On-Duration of the sidelink DRX, but reserves retransmission resources in Off-Duration by using the corresponding PSCCH. Therefore, Rx-UE needs to be woken up to detect all slots within On-Duration, and also needs to be woken up to detect the retransmitted PSCCH in the reserved slots. This may greatly reduce the length of On-Duration while maintaining PRR (Packet Reception Ratio) performance. If the traffic on a sidelink channel is very small, the number of slots configured in on-duration may be reduced to one. If HARQ based retransmission is involved, a great deal of power may be saved for unicast and groupcast. If blind retransmission is performed, a great deal of power may be saved for unicast, groupcast and broadcast.

Figure 2:
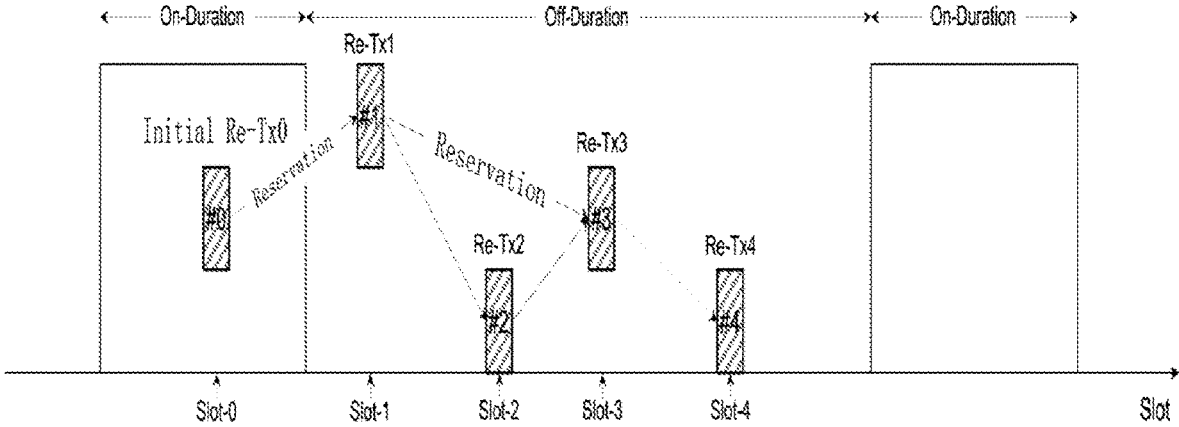
FIG. 2 is an example diagram of transmission (retransmission) and reception of DRX operation in Embodiment 1.

FIG. 2 illustrates the DRX process in transmission (retransmission) and reception, where Tx-UE transmits initial TB in On-Duration and retransmits the same TB in Off-Duration. Therefore, as the active time, Rx-UE detects PSCCH and performs initial TB reception within On-Duration, as well as retransmission TB reception within a reserved slot of Off-Duration.

In the example, specifically, the initial TB is transmitted in Slot-0 of On-Duration, and the corresponding PSCCH of the TB reserves resource #1 for retransmission Re-Tx1. Therefore, Rx-UE knows the resource slot reserved by PSCCH, that is, the Rx-UE only needs to detect the slot within On-Duration and reserved resource slot in Slot-1 within Off-Duration. It is worth noting that if the initial TB is not the first TB at the beginning of service, Tx-UE does not need to send the TB within On-Duration, as long as SCI reserves resources for the initial TB in the previous TB.

In addition, in retransmission Re-Tx1, the corresponding PSCCH reserves resource #2 and resource #3 for Re-Tx2 and Re-Tx3 respectively. Therefore, Rx-UE knows that PSCCH will appear in Slot-2 and Slot-3, so it only needs to detect the PSCCH in Slot-2 and Slot-3. The same transmission and retention process may be continued until delay budget is reached or Rx-UE successfully decodes TB.

If Tx-UE intends to send initial packets to Rx-UE and the Rx-UE is (pre)configured with DRX, the Tx-UE has to consider using either the common DRX mode or the default DRX mode, so that the packets sent by the Tx-UE is able to be received by the Rx-UE. The common DRX mode is defined as a DRX mode where all slots are supposed to be detectable by power-saving UE and the pattern is targeted for all transmission types (unicast, groupcast or broadcast).

The common DRX mode may be configured to have longer DRX cycle and shorter On-Duration. Within each DRX cycle, the power-saving UE starts the timer drx-CommonOnDurationTimer after offsetting the slot through drx-CommonSlotOffset. If the power-saving UE meets the following conditions, it is necessary to wake up and receive PSCCH, $$[(DFN \times 10) + \text{Slot-Number}(n)] \bmod(\text{drx-Common-Cycle}) = \text{drx-CommonStartOffse},$$

Where DFN is the direct frame number given by GNSS, drx-CommonCycle is the cycle of common DRX, Slot-Number is the current slot index, and drx-CommonStartOffset is the starting offset of common DRX.

It is worth noting that the reason for using DFN instead of SFN is that all UEs may align with the common DRX mode, regardless of whether the UEs are within or outside the coverage range.

In order to effectively reduce power consumption, short On-Duration is supposed to be maintained as much as possible. However, short On-Duration may lead to two problems; one is that it is more likely to cause half duplex between Tx-UEs, and the other is that interference from other Tx-UEs will be more severe, resulting in a reliability problem. To solve the problems of half duplex and reliability, the Tx-UEs are supposed to only consider blind retransmission (i.e., one initial TB and a plurality of retransmission TBs) in On-Duration. To solve the problems of interference and resource utilization efficiency, the Tx-UEs are supposed to consider HARQ based retransmission in Off-Duration. In addition, it is crucial to always maintain a reservation chain between two adjacent resources.

Figure 3:
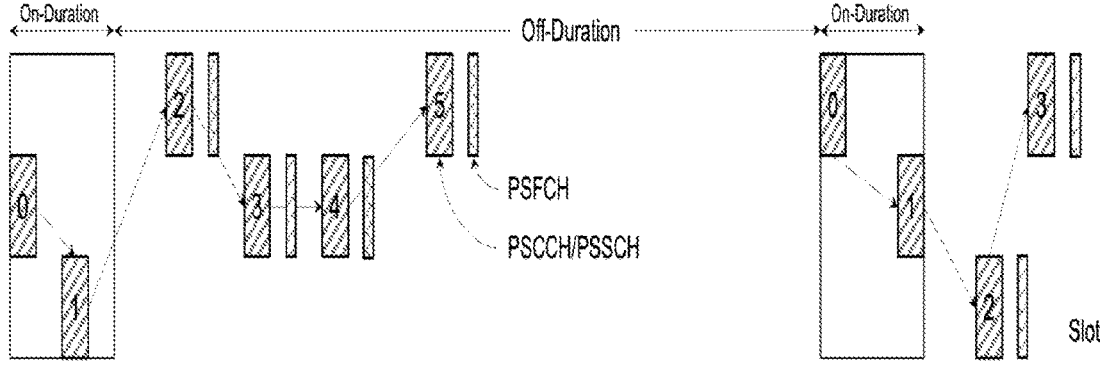
FIG. 3 is an example diagram of resource selection and reservation by using common DRX mode in Embodiment 1.

FIG. 3 provides an example of resource selection and reservation by using common DRX mode, where Tx-UE sends initial TB and a retransmission TB in On-Duration based on blind retransmission, and retransmits the same TB in Off-Duration based on an HARQ mechanism. Resource #0 is dedicated to initial transmission, while resource #1 is dedicated to blind retransmission (without configured PSFCH resources), which solves the problems of half duplex and initial packet reception reliability. In addition, resources #2 to #5 are reserved for retransmission based on the HARQ mechanism to improve the resource utilization efficiency and PRR performance. It is particularly important to note that blind retransmission in On-Duration may ensure that Rx-UE successfully receives SCI, in order to maintain the resource reservation chain between two adjacent resources.

In Rel-16, each resource pool is optionally configured to have PSFCH resources. The configured PSFCH resources are associated with the slot for transmitting PSCCH/PSSCH. In Rel-17, in order to achieve a combination of blind retransmission and HARQ based retransmission, flexible configuration of resource pools dedicated to the common DRX mode is taken into consideration. This means that in the configured resource pools, PSCCH/PSSCH resources without dedicated PSFCH resources may be configured in On-Duration for blind retransmission, while PSCCH/PSSCH resources with dedicated PSFCH resources may be configured in Off-Duration for HARQ based retransmission, as shown in FIG. 3.

In addition, Tx-UE is supposed to ensure that there are sufficient candidate resources in On-Duration when selecting resources. So that the MAC layer may smoothly select resources in On-Duration for initial data packet. Then the MAC layer is required to notify the PHY layer of the resource slot range supposed to be included in On-Duration when reporting candidate resources, or the PHY layer is informed of the specific configuration of DRX in advance. The MAC layer selects favorable resources for initial TB to complete initial transmission and blind retransmission of initial TB by optimizing a resource selection method. For example, when selecting resources for the initial packet in On-Duration, the priority of the packet may be increased to a higher value (such as a priority of 1). It is also possible to increase the code rate for PSCCH used for transmitting the initial packet in On-Duration, in order to ensure that all Rx-UEs are able to successfully decode PSCCH to obtain SCI information, guaranteeing the resource reservation chain between two adjacent resources.

In order to improve the PSCCH code rate for initial TB transmission in On-Duration, RRC is supposed to include two PSCCH configurations: one is an On-Duration related PSCCH configuration with a higher code rate, and the other is an Off-Duration related PSCCH configuration with a code rate equivalent to Rel-16.

In order to maintain backward compatibility with the UE of Rel-16, PSCCH/PSSCH resources with dedicated PSFCH resources need to be configured in each resource pool for HARQ based retransmission. In this case, the Tx-UE of Rel-17 is still supposed to transmit the initial TB and retransmission TB in On-Duration, but the Tx-UE needs to change its behavior towards the HARQ mechanism, that is, only ignoring the FCI information fed back by the Rx-UE in On-Duration. That is to say, regardless of whether ACK or NAK is received, Tx-UE has to complete all retransmissions in On-Duration. However, in Off-Duration, Tx-UE still needs to follow Rel-16's HARQ mechanism and perform retransmission based on the HARQ mechanism.

Embodiment 2

This embodiment solves the problems of how Tx-UE sends non-periodic packets and how Rx-UE receives non-periodic packets.

The Tx-UE is supposed to reserve up to two resources as retransmission resources when transmitting PSCCH. In order to ensure the resource reservation chain of reserved resources, two conditions are supposed to be met: one is that each Rx-UE is supposed to correctly decode SCI from the received PSSCH; and the other is that the resource re-evaluation and pre-emption mechanisms are supposed to be turned off through sl-PreemptionEnable in each (pre)configured resource pool. Failure to meet either of the conditions might result in the problem of discontinuity in the resource reservation chain.

A solution to the reliability problem of the initial TB has been proposed in Embodiment 1. But for the problem of how to ensure the continuity of the resource reservation chain after successful SCI decoding of the initial TB, an enhancement solution is taken into consideration, which is targeted at the following two scenarios:

Rx-UE successfully receives SCI, but SCI does not reserve any resources for packet retransmission. The following scenarios are taken into consideration:

assuming that the resource pools are configured with PSFCH resources associated with PSCCH/PSSCH;

the Rx-UE is unable to successfully decode TB on the corresponding PSSCH, so the Rx-UE provides ACK/NAK feedback to Tx-UE.

The Rx-UE successfully receives SCI during initial transmission, but does not successfully detect SCI in the current slot. The following scenarios are taken into consideration:

SCI is transmitted through Tx-UE reserved resources, but Rx-UE does not successfully detect SCI;

Tx-UE triggers re-evaluation, therefore the reserved resources are changed;

The reserved resources are pre-empted by other Tx-UEs with higher-priority TBs. Therefore, the Rx-UE fails to decode SCI, or the Rx-UE might correctly decode SCI but realize that it is not the SCI it requires.

To solve the above problems, two timers called drx-ReserveInstantTimer and drx-RetransmissionTimer are proposed. The former has been used in Embodiment 1, that is, once this timer runs, Rx-UE stops reception and closes its RF chain. The latter is a new timer. Once the Rx-UE correctly detects SCI but does not have any reserved resources, or fails to detect the required SCI related to retransmission, the Rx-UE will start the drx-RetransmissionTimer. Once this timer runs, the Rx-UE needs to be woken up and detect to decode the PSCCH in each slot.

Figure 4:
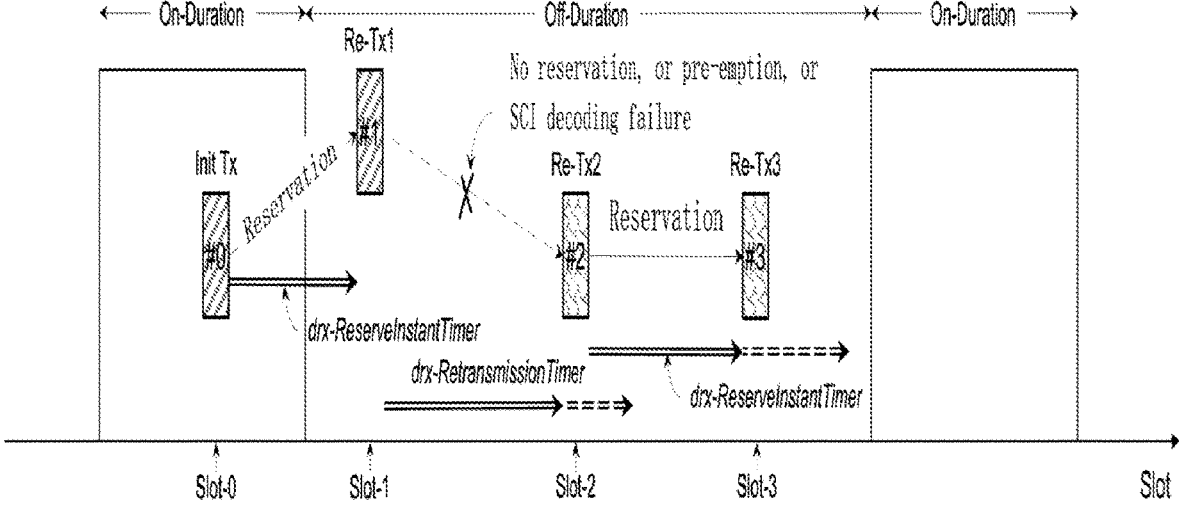
FIG. 4 is an example diagram of resource reservation chain failure caused by no resource reservation, resource pre-emption or SCI decoding failure in Embodiment 2.

FIG. 4 illustrates interruption of the resource reservation chain between Slot-1 and Slot-2 due to no resource reservation, resource pre-emption or SCI decoding failure. In this example, Tx-UE transfers initial TB in Slot-0 while reserving resource #1 for retransmission 1 (Re-Tx1). The Rx-UE successfully receives SCI but fails to decode TB. The Rx-UE sends ACK/NAK to the Tx-UE and starts the timer. When "drx-ReserveInstantTimer" is started, the Rx-UE stops reception and closes its RF chain until it is woken up in Slot-1 to receive packets again (mainly including retransmitted TB).

It is worth noting that drx-HARQ-RTT-Timer is started when the authorized PSSCH and PSFCH resources associated with PSCCH are configured. After the PSCCH is sent, Rx-UE sends ACK/NAK to Tx-UE and starts the drx-ReserveInstantTimer again. When the authorized PSSCH and the PSFCH resource associated with the PSCCH are not configured, Rx-UE starts the drx-ReserveInstantTimer immediately after the PSCCH is sent and the drx-HARQ-RTT-Timer is set to zero. Therefore, the drx-HARQ-RTT-Timer is determined based on the state of the PSFCH resource associated with the authorized retransmission.

The Tx-UE retransmits TB in Slot-1 but does not reserve any resources for Re-Tx2, or Tx-UE reserves resources but the resources are pre-empted by other Tx-UEs, or the Tx-UE retransmits TB in Slot-1 but the Rx-UE fails to decode SCI. If any situation occurs, the Rx-UE will immediately start the timer "drx-RetransmissionTimer". Once this timer runs, the Rx-UE is required to detect and decode PSCCH in each slot until the timer expires, or the Rx-UE receives retransmitted SCI.

Tx-UE selects resource #2 for Re-Tx2 in Slot-2 and retransmits TB, while reserving resource #3 for Re-Tx3. The Rx-UE successfully detects SCI and stops the timer "drx-RetransmissionTimer". Subsequently, if packet decoding is not successful, the Rx-UE starts the timer drx-ReserveInstantTimer again and is woken up in Slot-3 to receive the retransmitted packet.

Figure 5:
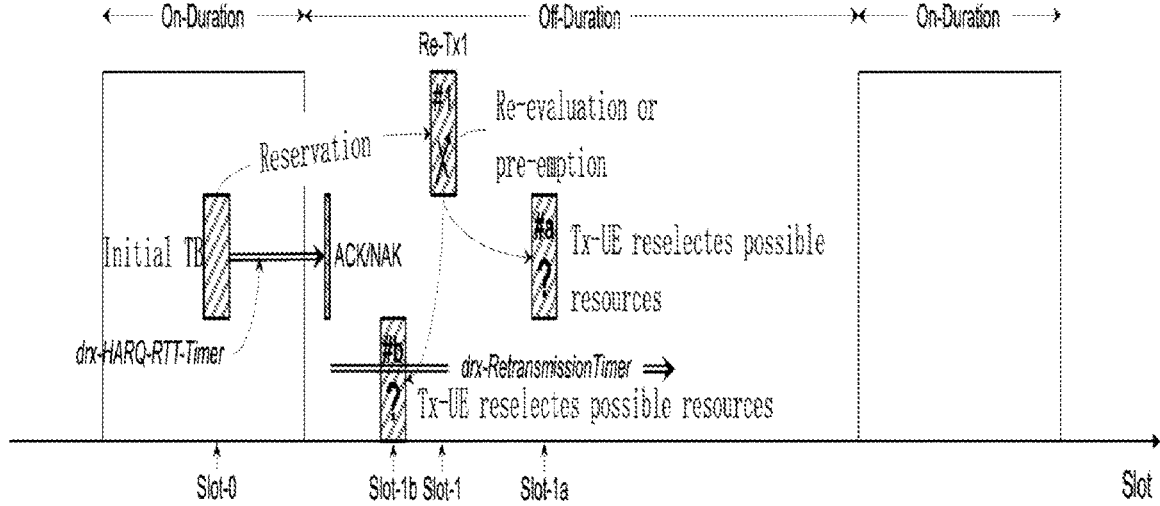
FIG. 5 is an example diagram of triggering resource reselecting due to resource re-evaluation and/or pre-emption mechanisms in Embodiment 2.

If the re-evaluation/pre-emption mechanism is enabled in the resource pools, the reselected resource slot position under triggering might affect the reception performance of the Rx-UE. Compared to reserved resource position (Slot-1) by SCI in Slot-0, the reselected resource slot position might be before or after Slot-1. As shown in FIG. 5, the Slot (slot-1) reserved by SCI in slot-0, the reselected resource #a in Slot-1a is after Slot-1, while the reselected resource #b in Slot-1b is before Slot-1. For the former, using "drx-ReserveInstantTimer" to receive retransmitted TB will not cause any problems. However, for the latter, the Rx-UE will not be able to receive the retransmitted TB.

A simple but not effective power-saving solution is to reuse an HARQ timer in Rel-16. This timer is defined as drx-HARQ-RTT-Timer in Rel-16. This means that after receiving the initial TB and not successfully decoding TB, the Rx-UE starts drx-HARQ RTT Timer. After providing NAK feedback, the Rx-UE indirectly starts drx-RetransmissionTimer. This solution does not involve drx-ReserveInstantTimer, but the shortcoming is that the Rx-UE needs to remain in a wake-up state and receive PSCCH for a long time.

Another solution is to prohibit the Tx-UE from reselecting resources before reserving resource slots once a resource re-evaluation/pre-emption mechanism is implemented. As shown in FIG. 5, Tx-UE excludes resource #b and reselects resource #a. In addition, when determining resource #a, the Tx-UE is supposed to choose a candidate resource that is closer to reserved resource #1, so that the Rx-UE is supposed to stop the timer earlier and achieve the power saving effect.

Another issue is how to solve the problem of DTX (Discontinuous Transmission) during the HARQ process. If the Rx-UE is unable to detect PSCCH related to the initial TB, the Rx-UE will not send the corresponding NAK to the Tx-UE. For the Rx-UE, such a reception failure is as if no TB transmission has occurred. This will reduce the overall PRR performance.

If the HARQ process uses HARQ Option-2, the Tx-UE may determine the DTX that occurred. Therefore, if an On-Duration timer is still running, the Tx-UE may retransmit TB in the same On-Duration; and if the delay budget allows, TB may be retransmitted in the next upcoming On-Duration.

Embodiment 3

This embodiment solves the problems of how Tx-UE sends periodic packets and how Rx-UE receives periodic packets.

In transmission and reception of periodic services, once Tx-UE starts the services and transmits the first TB to Rx-UE, the first TB is supposed to be transmitted within On-Duration to ensure reception by the Rx-UE. If the reservation of cycle resources remains unchanged before completion of specific services, the Rx-UE will wake up and only receive TB on the corresponding reserved cycle resources. However, due to continuous resource conflicts and the re-evaluation and pre-emption mechanisms that trigger resource reselection, the persistence of periodic resource reservation is unable to be guaranteed.

When SL_RESOURCE_RESELECTION_COUNTER=0 and the Tx-UE is based on a randomly selected value in interval [0, 1] that is less than or equal to sl-ProbResourceKeep (for example, 0.2, 0.4, . . . , 0.8), the Tx-UE triggers resource reselection. Therefore, the Rx-UE might lose resource reservation chains for periodic packets.

Figure 6:
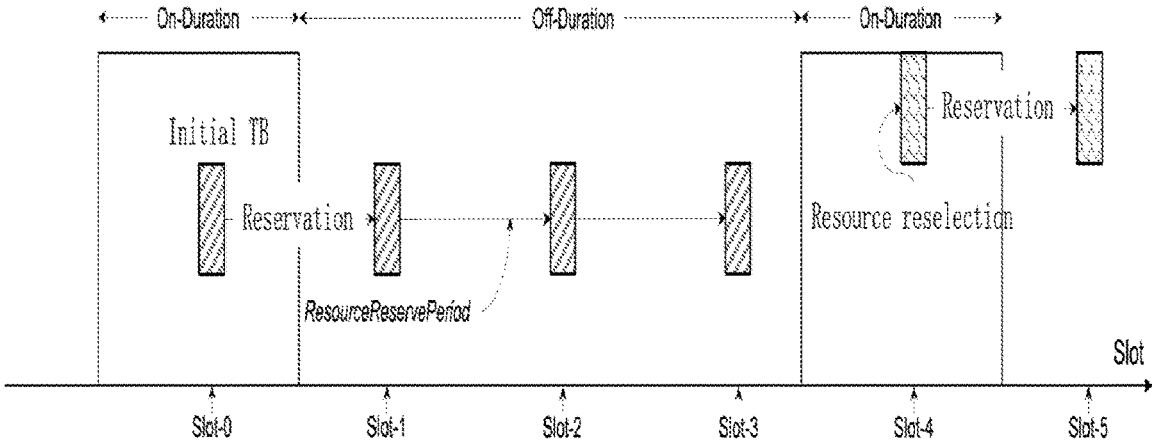
FIG. 6 is an example diagram of resource reselection consistently occurring in "On-Duration" in Embodiment 3.

One solution is to ensure that the Tx-UE only reselects resources during DRX On-Duration. In this way, the Rx-UE only wakes up to receive the periodic services in periodically reserved resources. Once the Rx-UE receives packets within On-Duration, the Rx-UE is supposed to detect whether the periodic resources are reselected. This requires MAC entities to use DRX cycles as a counting unit to determine whether resources are reselected, rather than counting TB transmission number as used in Rel-16. FIG. 6 illustrates an example where resource reselection occurs in Slot-4 of On-Duration. This ensures that the Rx-UE is supposed to detect reselected periodic resources.

However, the shortcoming of this solution is that a plurality of Tx-UEs might reselect resources in the same On-Duration, thereby increasing resource conflicts in On-Duration.

In addition to resource reselection mechanisms, re-evaluation and/or pre-emption mechanisms may also trigger periodic resource reselection. To ensure that resource reselection only occurs in On-Duration, it is necessary to disable the resource re-evaluation and/or pre-emption mechanisms by using sl-PreemptionEnable in (pre)configured resource pools.

Another problem is that due to resource conflicts or other low SINR reasons, the Rx-UE might not be able to detect periodic TB-related SCI reserved by ResourceReservePeriod. Although the Rx-UE may detect SCI and restore the reservation chains at the next reservation occasion, this will lead to a decrease in reception performance.

A specific timer is proposed to solve the problem of restoring the resource reservation chains. If the Rx-UE detects loss of the resource reservation chains, the Rx-UE is supposed to start the timer drx-ReceivePeriodTimer, where drx-ReceivePeriodTimer=ResourceReservePeriod. Once drx-ReceivePeriodTimer runs, the Rx-UE is supposed to wake up and detect PSCCH in each slot. If drx-ReceivePeriodTimer expires, or the Rx-UE detects PSCCH related to cycle services again, the Rx-UE will enter a normal power-saving reception mode. In this way, the Tx-UE does not need to force resource reselection to be executed in On-Duration.

Where the power-saving reception mode refers to that the Rx-UE only wakes up and receives the PSCCH in On-Duration and reserved resource slots, and decodes service packets associated with the Rx-UE. For specific description, please refer to Embodiment 1.

Figure 7:
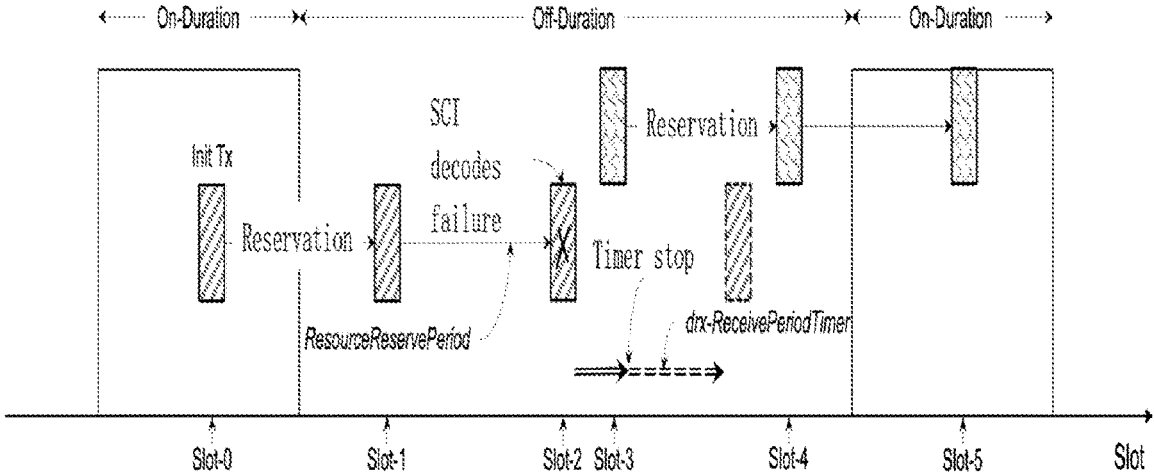
FIG. 7 is an example diagram of periodic traffic transmission and reception by using a reception timer in Embodiment 3.

FIG. 7 depicts an example of transmitting and receiving periodic services with a specific reception timer drx-ReceivePeriodTimer, where the Tx-UE transmits the initial TB in Slot-0 and reserves periodic resources in Slot-1 and Slot-2. In Slot 2, the Rx-UE is unable to detect SCI because the Tx-UE reselects resources. Therefore, the Rx-UE starts the timer and continues to detect SCI in each slot until it detects again that the associated SCI has reserved new periodic resources, or until drx-ReceivePeriodTimer expires. In example Slot-3, the Rx-UE detects the associated SCI again and stops the timer. Then, the Rx-UE will enter the normal power-saving reception mode.

If the re-evaluation/pre-emption mechanisms are enabled in the resource pools, the resources reserved by the Tx-UE might be pre-empted by another Tx-UE. Same as the issue discussed in Embodiment 2, reselection of resources triggered by the re-evaluation/pre-emption or SL_RESOURCE_RESELECTION_COUNTER mechanism might occur before or after the reserved resources in Slot-2. It is worth noting that as a worst-case scenario, this problem might result in the loss of a packet during periodic reception. In the example, if the reselected resources appear before the reserved resources, the Rx-UE may detect the relevant SCI in Slot-4, thereby restoring the reserved chains. However, the Rx-UE will miss the TB transmitted in the Slot-3 resource reselection.

Here, three mechanisms to solve the problem are taken into consideration:

As the first mechanism, the Tx-UE may set a sufficiently high priority for transmitting packets, such as a priority value of 1, so that other Tx-UEs no longer pre-empt the reserved resources. In this case, if the Rx-UE fails to detect SCI in Slot-2, "drx-ReceivePeriodTimer" is immediately started.

As the second mechanism, the Tx-UE is prohibited from reselecting resources before Slot-2. In this case, if the Rx-UE fails to detect SCI in Slot-2, "drx-ReceivePeriodTimer" is immediately started.

It is worth noting that in the above two mechanisms, since the Tx-UE based on DRX configuration belongs to the UE of Rel-17, it may be easily implemented without any impact on the UE of Rel-16 at the same time.

As the third mechanism, in Slot-1, if SL_RESOURCE_RESELECTION_COUNTER=1, then the Tx-UE may notify the Rx-UE through SCI or MAC-CE of reselection of periodic resources in the next transmission. It is worth noting that if a single bit indication is considered, the first SCI (1st SCI) is supposed to be preferred. This is because sensing UEs may also see this bit in order to start their sensing timers. In this case, "drx-ReceivePeriodTimer" is immediately started after detecting SCI in Slot-1.

Embodiment 4

This embodiment solves the problems of how Tx-UE transmits non-periodic packets for short PDB and how Rx-UE receives non-periodic packets for short PDB.

For packets with very short PDB required by QoS, the Tx-UE is supposed to immediately transmit the packets. In other words, this means that the DRX cycle needs to be kept short enough, which will cause power consumption problem for the Rx-UE.

On the basis of the common DRX mode discussed in Embodiment 1, a second DRX mode called specific DRX mode is defined. This means that using the common DRX mode, all UEs are supposed to have the same DRX configuration. For the specific DRX mode, a plurality of DRX modes will be configured for specific types of services or UEs. Configuring a plurality of DRX modes may simultaneously meet various services in the Tx-UE and the Rx-UE.

In each specific DRX configuration, the DRX parameters associated with QoS with short PDB are (pre)configured, where On-Duration only includes a small number of slots (at least one slot), where the DRX cycle is supposed to be less than the PDB. Here, common On-Duration and Off-Duration are defined as common On-Durations and common Off-Duration time in common DRX, while specific On-Duration and Off-Duration are defined as specific On-Duration and specific Off-Duration for specific QoS flow. Assuming that P QoSs require PDB (p) to have high priority, then CoDRX_Conf and SpDRX_Conf (p) may be used separately to (pre)configure common DRX and specific DRX modes, where p=1, 2, . . . , P. Common DRX may be used as a background configuration, and all UEs may use the background configuration at any time for their DRX mode alignment processes. In addition, the Tx-UE may choose SpDRX_Conf(p) configuration, meeting specific services, of QoS, and then send the index of p to all Rx-UEs through MAC-CE or SCI. Therefore, the specific DRX mode may be used on the basis of the common DRX mode. Once a specific service expires and no longer transmits relevant packets, the specific DRX mode ceases to be used, and the UE returns to the common DRX mode.

Figure 8:
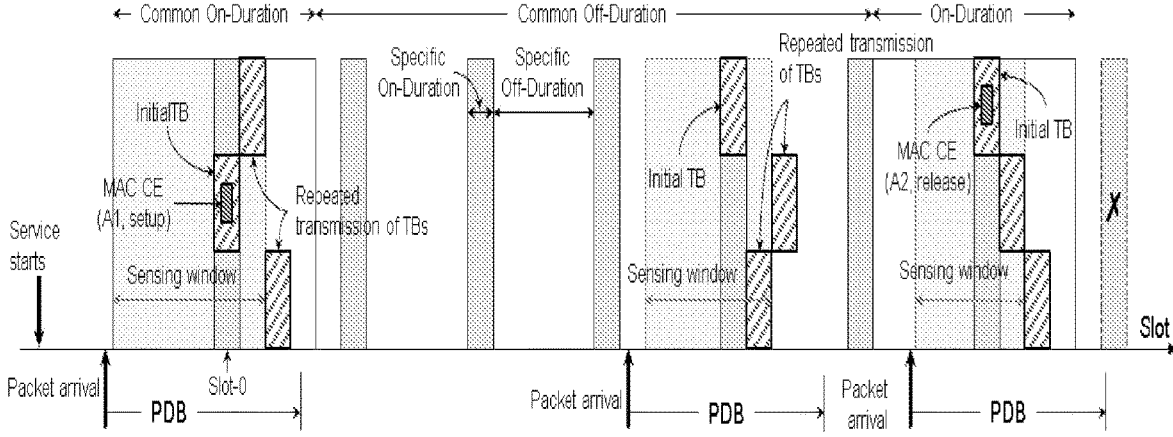
FIG. 8 is an example diagram of Dual-DRX configuration for common DRX and specific DRX in Embodiment 4.

Once a new service starts, the Tx-UE is supposed to wait for Common On-Duration to transmit the first initial TB which is associated with the first packet in the new service. As shown in FIG. 8, in Slot-0, when the Tx-UE transmits MAC-CE (or transmits SCI in PSCCH) while transmitting the first initial TB to notify the corresponding Rx-UE of the specific DRX parameter (i.e. index p, which may be a single or composite index). According to the configuration index p in MAC-CE or SCI, the Rx-UE sets specific DRX parameters. All UEs involved in the same service are supposed to maintain the use of the same specific DRX parameters until the service expires and the specific DRX parameters are released.

In the example in FIG. 8, if the index mark is A1, the Rx-UE sets the specific DRX parameters, and if the index mark is A2, the Rx-UE releases the specific DRX parameters.

Typically, non-periodic packets with short PDB require higher priority, so the Tx-UE may utilize the resource pre-emption mechanism to pre-empt resources in specific On-Duration for initial packet transmission, while select resources in specific Off-Duration for packet retransmission. In addition, due to the short PDB, the feedback HARQ mechanism might not work properly. Therefore, as described in Embodiment 1, blind retransmission or combination mechanisms may be considered to complete packet transmission.

Embodiment 5

Tx-UE needs to select a sensing window for channel sensing, and then select corresponding resource transmission packet in a resource selection window. While Rx-UE does not need to consider the sensing window, only needing to align with the selected resource slot for reception. As discussed in Embodiment 1, if there are no reserved resources previously transmitted, the Tx-UE can only follow DRX On-Duration for initial packet transmission, and the Rx-UE has to align with the same DRX mode to receive packets. Therefore, sensing and reception are fundamentally different. Although sensing accuracy might affect some PRR performance, sensing does not require high-precision information. The main purpose of sensing is for the Tx-UE to detect PSCCH, decode SCI and obtain resource information reserved by other Tx-UEs, in order to exclude resources during resource selection and avoid resource conflicts. However, reception requires alignment and adjustment of wakeup and sleep time between the Tx-UE and the Rx-UE to correctly decode packets.

In the Tx-UE sensing process, the most important thing is to adjust the relationship between sensing window Tsen, selection window Tsel and Tond (On-Duration). The relationship between Tsen and Tsel is the same as that of Rel-16, but there is no direct relationship between Tsen and Tond. This means that the determination of the sensing window does not directly depend on the position of On-Duration within the DRX cycle. However, there is a strong interrelationship between Tsel and Tond, at least the two windows need to be superposed partially, i.e. $T_{sel} \cap T_{ond} \neq \emptyset$, where $\emptyset$ is an empty set. This is because from the perspective of the Tx-UE, the selected candidate resources are used for packet transmission, while from the perspective of the Rx-UE, the packets need to be received on the same resources. This requires alignment of On-Duration between the Tx UE and the Rx UE at least for transmission and reception of initial packets.

Therefore, the sensing mechanism is supposed to determine the sensing window Tsen based on the arrival time of the packets (i.e., the time period of Tsen before packet arrival as the sensing window), determine the relationship between Tsel and Tond, and finally find the selection window Tsel.

It is worth noting that regardless of the relationships between On-Duration and the sensing window and between On-Duration and the selection window, the Tx-UE is supposed to not only sense the slots in the sensing window, but also all the slots in On-Duration to provide more channel sensing information for transmitted resource selection.

This embodiment solves the problem of how to sense reserved periodic resources for the partial sensing mechanism in sidelink DRX.

For given candidate resources in slot $t_y$, the Tx-UE is in a wake-up state to detect the slot $$t_{y-P'_a},$$

and determine whether to exclude the candidate resources in the slot $t_y$ from a resource set $S_A$; where $$P'_n$$

is the logical slot in the slots, which is converted from the physical slot $P_n$, n=1, 2, 3, . . . .

The traffic periodicity in NR may be diverse and may be (pre)configured in SL-ResourceReservePeriod, where SL-ResourceReservePeriod1=100×n, where n=0, 1, . . . , 10; or sl-ResourceReservePeriod2=INTEGER (1 . . . 99). Therefore, it is impossible to find a single sensing mode to sense the number of relevant period types for all ongoing services (the maximum configuration period number for each resource pool is 16). In addition, the time offset of Tx-UE transmission is also different, which further increases the difficulty of the sensing mode.

One solution is to ensure that each Tx-UE only performs resource (re)selection during DRX On-Duration, and then the Tx-UEs only perform partial sensing processes within On-Duration. This ensures that the Tx-UEs recognize the reserved resources and select the resources accordingly for packet transmission. However, the problem is that each Tx-UE is supposed to transmit TB in the On-Duration slots, which might cause an imbalance in the resources used between On-Duration and Off-Duration, leading to increased resource conflicts in the On-Duration slots.

Besides, due to the support for resource reselection and pre-emption mechanisms in NR-V2X in Rel-16, the resources reserved by the Tx-UEs may be changed after SCI transmission. Accordingly, there is no guarantee that the reselected resources will be within On-Duration. As a result, partial sensing UEs are unable to predict the reselected resources.

The solution to this problem is to derive a sensing window based on all periodicity configured in the resource pools. In this case, if the length of the sensing window is N slots and the number of periods (or types) is M, assuming there are no superposition slots, the maximum number of slots used for sensing is MN. This might turn partial sensing into full sensing, leading to Tx-UE power consumption.

Besides, the sensing mechanism with the MN slot is only applicable to sensing UEs that transmit periodic packets. This means that the sensing UEs know the arrival time of the packets and are able to pre-determine the selection window position. However, for non-periodic traffic sensing UEs, the method is not very effective because the Tx-UE is supposed to either prepare a sensing result in advance for any selection window or start sensing after the packets arrive. The former may cause a power consumption issue, while the latter, if the period resources reserved by the Tx-UE have longer periods, the packets transmitted by the sensing UEs have significant delay.

Figure 9:
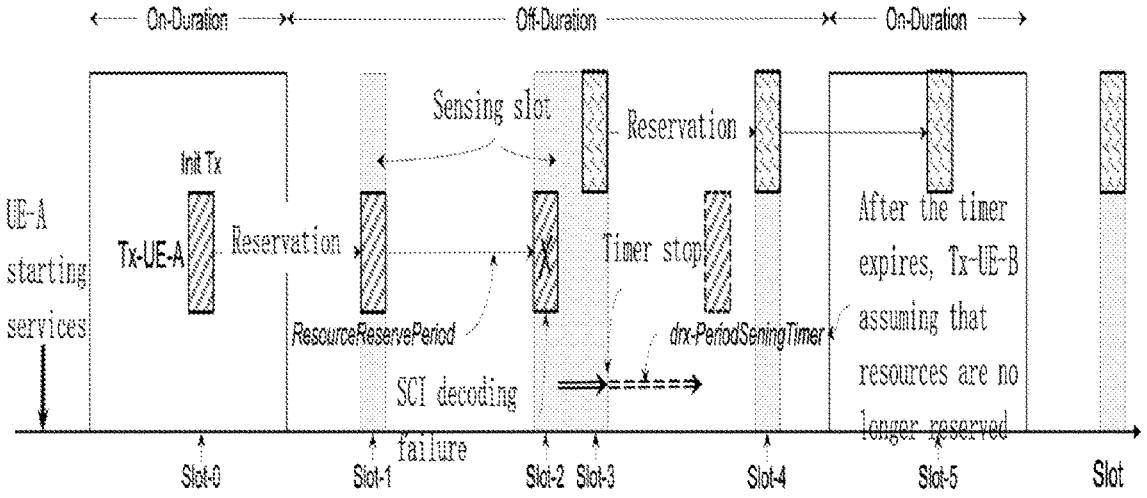
FIG. 9 is an example diagram showing that Tx-UE-A transmits periodic TB while Tx-UE-B performs channel sensing in Embodiment 5.

To solve the problem, an example as shown in FIG. 9 is provided first, where Tx-UE-A (i.e., the first transmitting UE) transmits a periodic TB based on reserved periodic resources, while Tx-UE-B (i.e., the second transmitting UE) attempts to use a partial sensing mechanism to sense sidelink channels. It is worth noting that in this embodiment, the Tx-UE-B needs to transmit periodic or non-periodic services, while the Tx-UE-A is only able to perform periodic service transmission, and Tx-UE-B might not be interested in the services provided by the Tx-UE-A.

In order to perform sensing, the Tx-UE-B only needs to wake up and sense regularly reserved resource channels of the Tx-UE-A, but the Tx-UE-B might also be unable to detect PSCCH signals. There are two reasons for detection failure: one is conflicts or low SINR; and the other reason is resource reselection caused by re-evaluation/pre-emption mechanisms or resource reselection counters.

Once the Tx-UE-B fails to detect SCI, the Tx-UE-B will start drx-PeriodSensingTimer and wake up to detect PSCCH in each slot. If drx-PeriodSensingTimer expires, or if the Tx-UE-B successfully detects PSCCH in a new slot, the Tx-UE-B will stop detecting PSCCH. Usually, drx-PeriodSensingTimer is supposed to be set to equal ResourceReservePeriod required for QoS in a specific service. In the example of FIG. 9, the Tx-UE-A starts the service and transmits the initial TB in Slot-0, while reselecting new resources in Slot-3.

In this way, the sensing UEs do not need to consider the traffic type (periodic and non-periodic) of the packets before the packets arrive, and the sensing UEs may be prepared to provide sensing results to an MAC layer at any time for resource exclusion during resource selection, thus performing resource (re)selection. The partial sensing process is suitable for sensing the reserved resource channels of periodic traffic of other Tx-UEs, and may be represented as a periodic partial sensing process.

As described in Embodiment 3, the same problem might arise as mentioned above, that is, the reselected resources might be before the previously reserved resources. Therefore, as a worst-case scenario, the Tx-UE might miss a sensing opportunity after Slot-2. Similarly, a solution may be achieved by prohibiting the selection of resources before the reserved resources as reselected resources.

Another problem closely related to power consumption is that the Tx-UE-B has to always sense every slot that is regularly reserved by other Tx-UEs. In each sidelink resource pool, a plurality of Tx-UEs with different period-icity and transmission time offsets may reserve the periodic resources. Therefore, sensing Tx-UE-B may only be woken up in different sensing clusters to perform channel sensing. The sensing clusters are defined as some superposition slots or some neighbor slots reserved by different Tx-UEs. If sensing UEs only consider these sensing clusters as channel sensing, power saving efficiency may be greatly improved.

The number of Tx-UEs using the same resource pool might be much larger than that of periodic ones, and some Tx UEs may transmit packets with the same period at different time offsets. In NR-V2X, the threshold is config-ured using the value of $Th(prio_{RX}, prio_{TX})$, and the sensing Tx-UE-B compares the received RSRP with the threshold and determine whether to exclude resources. Where $prio_{TX}$ and $prio_{RX}$ are priorities used for transmitting and receiving packets respectively. Therefore, based on the same thresh-old, the sensing Tx UE-B may first determine which Tx UEs are sensing candidate UEs, so the sensing Tx UE-B does not need to sense the resource channels reserved by all Tx UEs.

Figure 10:
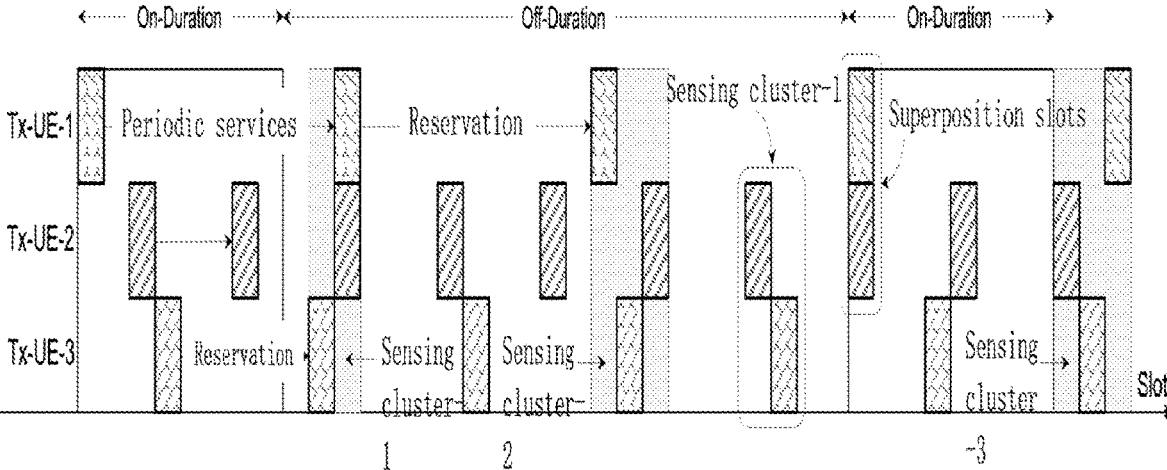
FIG. 10 is an example diagram of partial sensing of channels with periodic traffic by using sensing clusters in Embodiment 5.

As shown in FIG. 10, Tx-UE-1, Tx-UE-2 and Tx-UE-3 transmit periodic packets with different periodicity, while the Tx-UE-B attempts to sense the resource slots reserved by the three Tx-UEs and the channels in On-Duration. Three types of traffic with different periods will generate a plurality of sensing clusters, which may contain different amounts of resources to be sensed. Besides, some sensing clusters are far away from On-Duration, while some sensing clusters are close to On-Duration. In the example, sensing cluster 1 and sensing cluster 3 are close to On-Duration. Therefore, com-pared to slot sensing in On-Duration, the reserved resource information obtained by the Tx-UE-B waking up and sens-ing slots in sensing cluster 1 and sensing cluster 3 might be basically the same. On the contrary, sensing cluster 2 is between two On-Duration, and the Tx-UE-B wakes up and is able to sense the updated reserved resource information. So, an effective method is that the Tx-UE-B wakes up and senses associated slot channel only in sensing cluster 2.

In the previous solution, it is assumed that all Tx-UEs belong to Rel-17 power-saving UEs, and rely on the con-figuration of DRX to transmit packets. In addition, the sensing UEs perform channel sensing and derive resources reserved by other Tx-UEs, but other Tx-UEs may be either Rel-16 UEs or UEs that do not require DRX configuration. For example, some Tx-UEs belong to Rel-17 UEs and may implement a new sensing process for resource reselection, while some Tx-UEs may be ordinary UEs without DRX configuration, such as vehicle UE, and some Tx-UEs belong to Rel-16 UEs and have to follow the resource reselection process in Rel-16 (including reselection, rea-evaluation and pre-emption mechanisms). Therefore, the previously pro-posed solution might not guarantee overall performance, as this scenario is unable to ensure that the first initial packet initialized at the beginning of service is able to be transmit-ted in On-Duration.

A partial sensing enhancement solution is proposed, where the sensing UEs will establish specific sensing cycles with $T_{cycle}$ slots, and each of the sensing cycle is provided with L partial sensing windows with the length of $T_W$, $T_{cycle}$ and L are configured by RRC in each resource pool. The position of each partial sensing window may be determined by the sensing UEs, or be configured by RRC using window offset $\Delta_{W,l}$ in each resource pool, l=1, 2, . . . , L, where $T_{MIN} \le T_W \le T_{MAX}$ and $T_{MIN}$ and $T_{MAX}$ are the minimum and maximum cycle lengths configured in the current resource pool respectively, L=1, 2, . . . , $\lfloor T_{cycle}/T_{MAX} \rfloor$, while $T_{MAX} \ll T$-

$_{cycle}$. The sensing UEs wake up in the partial sensing windows and sense the sidelink channels of all slots. The size of partial sensing windows may be adaptive according to current traffic in transmission in current resource pool. For example, $T_{cycle}$=1000 slots, $T_W$=100 slots and L=1, in this way, periodic reserved resource information for all Tx-UEs below 100 slots may be obtained through the partial sensing window $T_W$. And compared to full sensing UEs, partial sensing UEs may achieve 90% of power saving. If L>1, the size of the partial sensing windows during a specific sensing cycle may vary, it is also decided by the sensing UEs.

The following information may be obtained through sens-ing of the partial sensing windows:

The number of traffic cycles in transmission in current resource pool and corresponding cycle length; and The time offset of periodic resources between the Tx-UEs and the sensing UEs.

Based on channel conditions, how or whether to perform sensing in specific partial sensing windows depends on the implementation of UEs. For example, if the number of NAKs received by is greater than a certain threshold, the sensing UEs may activate some or all of its (L) partial sensing windows $T_W$ within the specific sensing cycles. Alternatively, the sensing UEs may adjust the size of TW based on a set threshold. For example, if the number of NAKs received is greater than a certain threshold, the sensing UEs may improve the sensing accuracy of the sidelink channels by increasing the TW number (≤L). Alter-natively, the sensing UEs may adjust the size of TW based on the number of sensed long-period reserved resources (or occurrence frequency), thereby balancing the channel sens-ing accuracy and the power-saving effect. This is because for the channel sensing accuracy, long-period reserved resources have less impact than short-period reserved resources, and reducing TW is not too sensitive to overall system performance. Similarly, the mechanism of adjusting TW size may be achieved by setting a number threshold for the long-period reserved resources.

Alternatively, the relationship between TW and the threshold may be (pre)configured by RRC. For example, the number of cycles and corresponding cycle lengths in the resource pool are M and Nm respectively, and m=1, 2, . . . , M. The threshold for the number of long-period reserved resources may be (pre)configured as THm, while Nm and THm correspond to each other. The sensing UEs may determine TW by comparing the number of reserved resources in the sensing long period and THm.

Alternatively, if a minimum sensing window (such as $T_{MAX}$) is configured in each resource pool, sensing clusters may be used as partial sensing windows, and setting of the partial sensing windows does not require any limitation of sensing cycles.

Because the Tx-UEs may use a plurality of resource pools simultaneously, a specific sensing cycle may be configured for use by the plurality of resource pools. The partial sensing window of $T_W$ may be determined by the minimum cycle length TMIN and the maximum cycle length $T_{MAX}$ config-ured in the plurality of resource pools. The sensing UEs wake up in the specific sensing windows and sense the sidelink channels of all slots within the specific sensing windows in all resource pools. Through the specific sensing window $T_W$, periodic reserved resource information for all other Tx-UEs below $T_{MAX}$ slots in the plurality of resource pools may be obtained. In this way, maximum power saving may be achieved.

Similarly, the sensing UEs may adjust the size of $T_W$ according to set thresholds (such as the number of NAKs, the number of long-period reserved resources, etc.). For example, if the number of NAKs received is greater than a certain threshold, the sensing UEs may improve the sensing accuracy of the sidelink channels by increasing TW. On the contrary, if the number of NAKs received is less than a certain threshold, the sensing UEs may improve power saving efficiency by reducing TW. The relationship between TW and the threshold may be (pre)configured by RRC.

Embodiment 6

This embodiment solves the problem of how to sense reserved non-periodic resources for the partial sensing mechanism in sidelink DRX.

In Rel-16, sensing mechanisms used for periodic and non-periodic services are the same. However, the size of the sensing windows used varies, that is, the sensing window used for periodic services is 1100 ms, while the sensing window used for non-periodic services is 100 ms. This is because in non-periodic service situations, long sensing windows are unable to obtain more reserved resource information.

If partial sensing UE does not consider DRX mode, a selection window may be set immediately after non-periodic packets arrive. But if the partial sensing UE considers the DRX mode, after the non-periodic packets arrive, the partial sensing UE chooses the nearest DRX On-Duration for transmission. The sensing windows are supposed to provide sufficient time (at least 31 slots) for channel sensing between the arrival time of the packets and the start time of On-Duration. The partial sensing process is suitable for sensing the reserved resource channels of non-periodic traffic of other Tx-UEs, and may be represented as a non-periodic partial sensing process.

Figure 11:
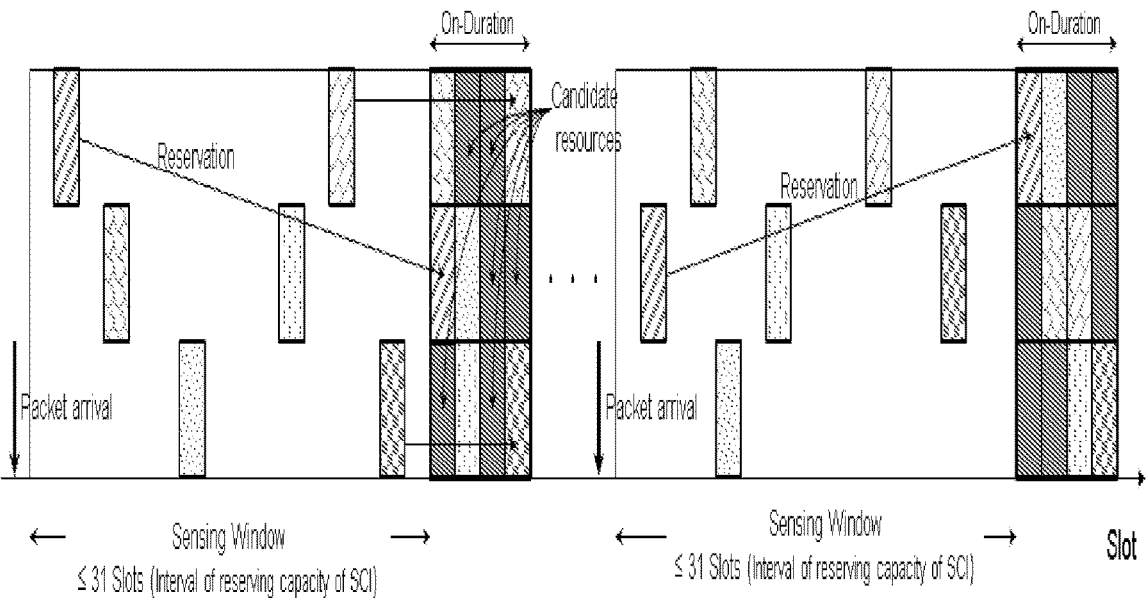
FIG. 11 is an example diagram of partial sensing of channels with non-periodic traffic by using short sensing windows in Embodiment 6.

FIG. 11 illustrates that the partial sensing UE has the non-periodic packet transmission and performs the non-periodic partial sensing process, with a short sensing window of 31 slots, in order to completely exclude the non-periodic resources reserved by other Tx-UEs.

If the packet delay budget is relatively short, the sensing UE is supposed to start sensing immediately after the packets arrive and select resources on the nearest DRX On-Duration. However, this might cause a problem, that is, the sensing process is unable to completely exclude resources reserved by other Tx-UEs for non-periodic transmission.

The sensing process of the non-periodic traffic may be achieved through the timer drx-SensingTimer. After the packets of Tx-UE arrives, the Tx-UE begins to detect 31 slots before DRX On-Duration occasion for resource selection. In addition, the Tx UE will continue to detect until packet (retransmission) transmission is successfully received, or drx-SensingTimer expires. Rx-UE only needs to monitor the slots in On-Duration and the slots in reserved resources, the monitoring is implemented by drx-ReserveInstantTimer, depending on the 1st SCI decoding situation.

Figure 12:
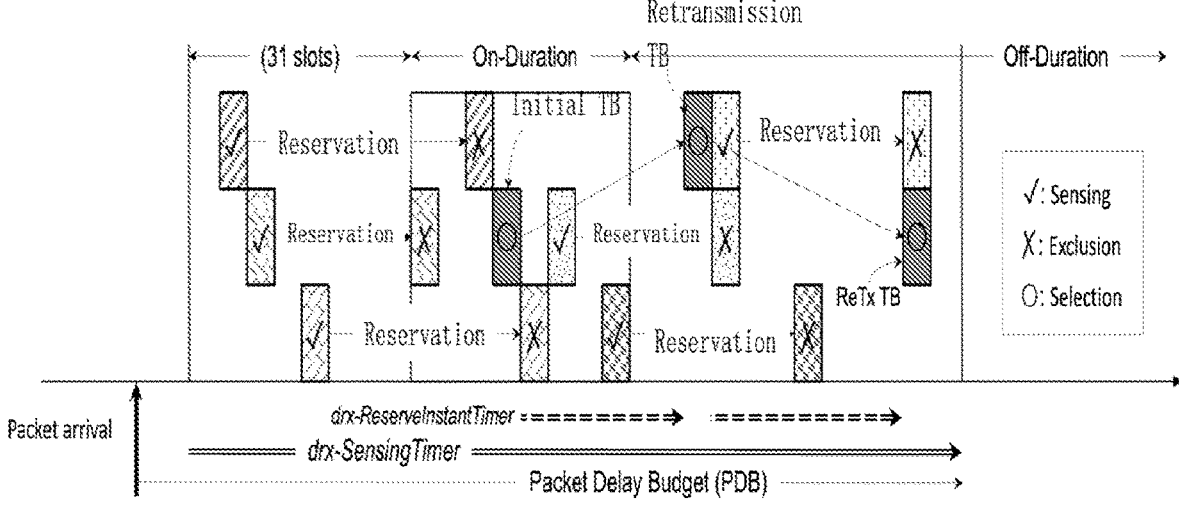
FIG. 12 is an example diagram of partial sensing of channels with non-periodic traffic in Embodiment 6.

FIG. 12 illustrates the partial sensing process of the non-periodic traffic, where the Tx-UE starts sensing before 31 slots of On-Duration and selects initial TB transmission resources within On-Duration. Retransmission is performed in Off-Duration by maintaining resource reservation chains, ensuring transceiving alignment of Rx-UE packets and Tx-UE packets.

It is worth noting that once drx-ReserveInstantTimer runs, the Rx-UE will stop receiving the packets. If drx-ReserveInstantTimer and drx-onDurationTimer are superposed, the Rx-UE is supposed to prioritize drx-onDurationTimer.

If PDB is less than 32 slots, in order to meet the PDB requirements, the sensing time of the Tx-UE will be very little, and accordingly, the Tx-UE has to maintain a sensing window of less than 32. Accordingly, resources reserved by other Tx-UEs for non-periodic transmission might not be completely excluded, leading to resource conflicts. In addition, if other Tx-UEs have high-priority packets, the Tx-UE is not supposed to turn off the sensed sidelink RF during packet transmission to ensure that all reserved resource channels may be sensed. Instead, the Tx-UE has to perform full sensing in order to obtain channel information.

If the Tx-UE wakes up to conduct full sensing of a specific service, the Tx-UE is supposed to start the full sensing process before the 32 slots of the first On-Duration occasion after the first packet arrives, and stop the full sensing process during the slot when the last packet is successfully transmitted, as shown in the proposal in FIG. 8.

If the Tx-UE has high power saving requirements, random resource selection may be performed. Random resource selection is that random selection is performed without sensing, that is, UE reports all candidate resources within the selection window to the MAC for random selection in a specific resource pool without any exclusion process.

In Rel-17, a sidelink transmission resource pool may be (pre)configured based on full sensing, partial sensing, random resource selection or any combination to achieve packet transmission. Therefore, the Tx-UE may use partial sensing for long-period services through combination, while use random resource selection for short-period services.

Periodic partial sensing and non-periodic partial sensing mechanisms may usually be used simultaneously. This is because the Tx-UE might have periodic or non-periodic traffic, and the sensing UE has to simultaneously capture and infer reserved resource information of both traffic types.

The resource pool is configured by SL-ResourcePool, where the periodicity of the packets may be configured by selecting SL-ResourceReservePeriodList. If a periodicity list is not configured, the UE is only able to transmit the non-periodic packets. In this case, the sensing process may rely on a non-periodic partial sensing mechanism. If the periodicity list is configured, both periodic and non-periodic traffic may be transmitted in one resource pool, and both periodic and non-periodic partial sensing mechanisms have to be considered simultaneously.

The embodiments of the present invention have been described in detail above, but are merely embodiments, and the present invention is not limited thereto. Any equivalent modifications and substitutions made to the present invention are also within the scope of the present invention for those skilled in the art. Therefore, equivalent changes and modifications made without departing from the spirit and scope of the present invention should be included within the scope of the present invention.

What is claimed is:

1. A power-saving New Radio (NR) sidelink transmission and reception method, the method comprising:

in a Discontinuous Reception (DRX) mode, a Transmitter user equipment (Tx-UE) transmitting an initial Transport Block (TB) in On-Duration and reserving periodic or non-periodic resources for the retransmission of the initial TB or the transmission of other TBs for the initial transmission by using a Sidelink Control Information (SCI) format, wherein a number of the periodic or non-periodic resources is from 1 to N, where N is a positive integer greater than or equal to 2, and configuring at least one first DRX timer, and based on the first DRX timer, the Tx-UE performing channel sensing in a slot of a sensing window and On-Duration slots, and configuring at least one second DRX timer, and based on the second DRX timer, a Receiver user equipment (Rx-UE) entering a wake-up state to receive the initial TB in time intervals associated with the reserved periodic or non-periodic resources and/or the On-Duration slots, wherein the reserved periodic or non-periodic resources are indicated by SCI and located at On-Duration and/or Off-Duration;

wherein the On-Duration is a predetermined time interval where Tx-UE and Rx-UE are active for transmission and reception, respectively;

wherein if the Tx-UE reserves non-periodic resources and if the Rx-UE correctly detects the SCI from Physical Sidelink Control Channel (PSCCH) but has not reserved any resources or the Rx-UE fails to detect a required SCI related to TB retransmission, the Rx-UE starts a timer drx-RetransmissionTimer, is woken up at each slot, and performs PSCCH decoding until the timer drx-RetransmissionTimer expires, or the Rx-UE receives a retransmitted SCI; afterwards, the Rx-UE enters a power-saving reception mode, wherein the power-saving reception mode means that the Rx-UE enters a wake-up mode in the On-Duration slots and reserved resources for receiving the PSCCH as well as decoding and receiving TB associated with the Rx-UE.

2. The power-saving NR sidelink transmission and reception method according to claim 1, wherein if the initial TB is not the first TB at the beginning of service, the Tx-UE does not need to send the initial TB in the On-Duration, as long as the SCI reserves resources for the initial TB in the previous TB.

3. The power-saving NR sidelink transmission and reception method according to claim 1, wherein the PSCCH carried in the initial TB and/or the retransmission TB indicates a slot of the reserved resource of a next retransmission TB until a delay budget is reached or the Rx-UE performs successful decoding.

4. The power-saving NR sidelink transmission and reception method according to claim 1, wherein the first DRX timer is a timer used for sensing, comprising drx-PeriodSensingTimer and drx-SensingTimer; the second DRX timer is a timer used for packet reception, comprising one or more of drx-OnDurationTimer, drx-CommonOnDurationTimer, drx-OffDurationTimer, drx-CommonOffDurationTimer, drx-SpecificOffDurationTimer, drx-ReservePeriodTimer, drx-ReserveInstantTimer, drx-HARQ-RTT Timer and the drx-RetransmissionTimer.

5. The power-saving NR sidelink transmission and reception method according to claim 1, wherein the Tx-UE transmits the first initial TB at the beginning of service in On-Duration and reserves periodic resources for different initial TBs in On-duration and/or Off-duration by using SCI format; the Rx-UE enters a wake-up state during an On-Duration slot to receive the initial TBs, and infers information of the reserved periodic resources through ResourceReservePeriod, wherein the ResourceReservePeriod is selectively configured in the SCI; a timer drx-ReservePeriodTimer=ResourceReservePeriod is set as an active time of the Rx-UE, and the Rx-UE also receives different initial TBs in time intervals associated with all reserved periodic resources; wherein if drx-ReservePeriodTimer and drx-onDurationTimer are superposed, the Rx-UE prioritizes the drx-onDurationTimer; and if drx-ReservePeriodTimer and other reserved resource slots are superposed, the Rx-UE prioritizes detecting the reserved resource slots.

6. The power-saving NR sidelink transmission and reception method according to claim 1, wherein if the Tx-UE transmits the first initial TB at the beginning of service in On-Duration and a transmission interval between adjacent TBs is less than 32 slots, transmitted resources are continuously reserved for the next TB by the SCI associated with each TB; the Rx-UE sets a timer the drx-ReserveInstantTimer as an active time, only monitoring the On-Duration slots and time intervals associated with all reserved resources.

7. The power-saving NR sidelink transmission and reception method according to claim 1, wherein if the Tx-UE transmits the first initial TB at the beginning of service in On-Duration and the transmission interval between adjacent TBs is greater than 32 slots, the Tx-UE uses the SCI format without reserving any resources for transmission; the Rx-UE only enters the wake-up state during the On-Duration slot to receive the initial TBs.

8. The power-saving NR sidelink transmission and reception method according to claim 1, wherein the DRX mode comprises a common DRX mode, also known as a default DRX mode, and the Tx-UE selects the common DRX mode to send the initial TB; wherein the common DRX mode is configured to have long DRX cycles and short On-Duration; within each long DRX cycle, a power-saving UE starts a timer drx-CommonOnDurationTimer after a drx-CommonSlotOffset, when satisfying a condition $$[(DFN \times 10) + Slot\text{-}Number(n)] \bmod (drx\text{-}Common\text{-}Cycle) = drx\text{-}CommonStartOffset,$$

the power-saving UE enters a wake-up state and receives a PSCCH; wherein DFN (direct frame number) is a direct frame number provided by GNSS and may be obtained within and outside a coverage range, drx-CommonCycle is a cycle of the common DRX, Slot-Number(n) is a current slot index, n is a natural number, and drx-CommonStartOffset is a DRX common offset slot.

9. The power-saving NR sidelink transmission and reception method according to claim 8, wherein in the common DRX mode, the Tx-UE uses blind retransmission for transmission in On-Duration, i.e. one initial TB and at least one retransmission TB, and/or the Tx-UE uses retransmission based on the basis of a Hybrid Automatic Repeat Request (HARQ) mechanism for transmission in Off-Duration.

10. The power-saving NR sidelink transmission and reception method according to claim 9, wherein PSCCH/Physical Sidelink Shared Channel (PSSCH) resources without dedicated Physical Sidelink Feedback Channel (PSFCH) resources are configured in On-Duration for blind retransmission, and PSCCH/PSSCH resources with dedicated PSFCH resources are configured in Off-Duration for retransmission based on the HARQ mechanism.

11. The power-saving NR sidelink transmission and reception method according to claim 9, wherein in On-Duration, a Medium Access Control (MAC) layer selects favorable resources for the initial TB to complete the transmission and blind retransmission of the initial TB by optimizing a resource selection method, wherein the optimization of the resource selection method comprises at least one of the following:

increasing a priority of the initial TB; or increasing a Code Rate of PSCCH corresponding to initial TB transmission.

12. The power-saving NR sidelink transmission and reception method according to claim 8, wherein the DRX mode also comprises a specific DRX mode for specific services, which is configured with a short DRX cycle, and in each specific DRX configuration, DRX parameters associated with a Quality of Service (QoS) of a short Packet Delay Budget (PDB) are pre-configured; wherein On-Duration contains at least one slot, and a DRX cycle is smaller than the short PDB.

13. The power-saving NR sidelink transmission and reception method according to claim 12, wherein UE uses the specific DRX mode on the basis of the common DRX mode and switches between the common DRX mode and the specific DRX mode based on specific service requirements, wherein the switching between the common DRX mode and the specific DRX mode comprises: receiving control signals from Medium Access Control Control Element (MAC-CE) or SCI so as to switch between the common DRX mode and the specific DRX mode; and when a specific service expires and no longer transmits relevant packets, the specific DRX mode ceases to be used, and the Rx-UE returns to the common DRX mode.

14. The power-saving NR sidelink transmission and reception method according to claim 1, wherein if a resource re-evaluation and/or the pre-emption mechanisms are enabled in a resource pool, the Rx-UE starts a timer drx-HARQ-RTT-Timer after receiving initial TB and not successfully decoding a TB, and the Rx-UE indirectly starts a timer drx-RetransmissionTimer after Non Acknowledgment (NAK) feedback, wherein the drx-HARQ-RTT Timer timer is determined according to a PSFCH resource status associated with an authorized retransmission.

15. The power-saving NR sidelink transmission and reception method according to claim 1, wherein if a resource re-evaluation and/or the pre-emption mechanisms are enabled in a resource pool, Tx-UE is prohibited to reselect resources before the slots of the reserved resources, and the Tx-UE preferably selects resources that are closer to slots of the reserved resources for reselected resources.

16. The power-saving NR sidelink transmission and reception method according to claim 1, wherein if Tx-UE uses a retransmission based on an Hybrid Automatic Repeat Request (HARQ) mechanism for transmission in Off-Duration, an HARQ process uses HARQ Option-2 and Rx-UE fails to detect PSCCH related to the initial TB, then the Tx-UE retransmits a TB in the same On-Duration as the initial TB or retransmits the TB in the next upcoming On-Duration within delay budget.

17. The power-saving NR sidelink transmission and reception method according to claim 1, wherein if Tx-UE reserves periodic resources and a resource reservation chain is lost due to continuous resource conflicts and triggering of resource reselection by the Tx-UE, then the Tx-UE is configured to reselect resources only during On-Duration, and Rx-UE enters the wake-up state only during On-Duration and time intervals associated with the reserved periodic resources to receive the initial TB or retransmitted TB; wherein MAC entities of the Tx-UE use a DRX cycle as a counting unit to determine whether the reserved periodic resources need to be reselected.

18. The power-saving NR sidelink transmission and reception method according to claim 17, wherein if resource re-evaluation and/or pre-emption mechanisms are enabled in a pre-configured resource pool, then the resource re-evalu-ation and/or pre-emption mechanisms are disabled by using sl-PreemptionEnable in the pre-configured resource pool.

19. The power-saving NR sidelink transmission and reception method according to claim 1, wherein if Tx-UE reserves periodic resources and a resource reservation chain is lost due to continuous resource conflicts and triggering of resource reselection by the Tx-UE, Rx-UE starts a timer drx-ReceivePeriodTimer, wherein drx-ReceivePeriodTimer=ResourceReservePeriod, the Rx-UE is woken up at each slot and detects PSCCH decoding until the timer drx-ReceivePeriodTimer expires, or, the Rx-UE detects PSCCH related to reserved periodic resources again; afterwards, the Rx-UE enters a normal power-saving reception mode which means that the Rx-UE only enters a wake-up mode in On-Duration slots and reserved resources for receiving PSCCH as well as decoding and receiving the TB associated with the Rx-UE.

20. The power-saving NR sidelink transmission and reception method according to claim 19, wherein before a resource reservation chain is lost, Tx-UE adopts any of the following ways to prevent periodic resources reserved by the Tx-UE from being preempted by another Tx-UE, comprising:

increasing a priority of the initial TB; or prohibiting the Tx-UE from reselecting resources before the slots of reserved resources; or notifying Rx-UE in advance through SCI or Medium Access Control Control Element (MAC-CE) of a reselection of periodic resources in next transmission.

21. The power-saving NR sidelink transmission and reception method according to claim 1, wherein the method further comprises: for the periodic resources reserved by a first Tx-UE, a second Tx-UE adopts a partial sensing mechanism to perform channel sensing, and provides sensing results to an MAC layer for resource selection or resource reselection, the partial sensing mechanism comprises:

the second Tx-UE enters a wake-up state in each slot of the periodic resources reserved by the first Tx-UE to sense SCI on PSCCH; when SCI detection fails, the second Tx-UE starts a timer drx-PeriodSensingTimer, wakes up and detects PSCCH in each slot until the timer drx-PeriodSensingTimer expires, or until the second Tx-UE successfully detects PSCCH in a new slot;

wherein the first Tx-UE and the second Tx-UE are different Tx-UEs.

22. The power-saving NR sidelink transmission and reception method according to claim 1, wherein the method further comprises: in each resource pool, at least two first Tx-UEs with different periodicity and/or different transmission time offsets have reserved periodic resources, and the second Tx-UE is only woken up in different sensing clusters to perform channel sensing related to the second Tx-UE, and the sensing clusters are configured as superposition slots or neighbor slots of the periodic resources reserved by at least two different first Tx-UEs, wherein the first Tx-UE and the second Tx-UE are different Tx-UEs.

23. The power-saving NR sidelink transmission and reception method according to claim 1, wherein the method further comprises: when Tx-UE reserves periodic resources, a sensing UE establishes specific sensing cycles with $T_{cycle}$ slots, each specific sensing cycle is configured to have L partial sensing windows with a length of Tw, and the position of each partial sensing window is determined by the sensing UE or configured by RRC using window offset $\Delta_{w,l}$ in each resource pool, and the sensing UE is woken up in the partial sensing windows and senses PSCCH of all slots; wherein $T_W$ is the Cycle Length of the Partial Sensing windows and satisfies $T_{MIN} \leq T_W \leq T_{MAX}$, $T_{MIN}$ and $T_{MAX}$ are minimum and maximum cycle lengths configured in a current resource pool respectively, L is a number of the partial sensing windows, L=1,2, . . . , $\lfloor T_{cycle}/T_{MAX} \rfloor$ and $T_{MAX} \ll T_{cycle}$, l=1,2, . . . , L;

wherein one or more pieces of the following information may be obtained by sensing partial sensing windows:

a number of traffic cycles in transmission in the current resource pool and corresponding cycle length; and a time offset of periodic resources between Tx-UEs and sensing UEs.

24. The power-saving NR sidelink transmission and reception method according to claim 23, wherein the second Tx-UE determines whether to activate the partial sensing window $T_W$ within a specific sensing cycle based on a preset threshold, and/or adjusts the length of the partial sensing window $T_W$;

wherein the preset threshold is a number of received NAKs, or a number or occurrence frequency of sensed long-period reserved resources.

25. The power-saving NR sidelink transmission and reception method according to claim 24, wherein a relationship between $T_W$ and a threshold is configured or pre-configured by RRC;

wherein a number of cycles and corresponding cycle lengths in a resource pool are M and $N_m$ respectively, and m=1,2, . . . , M; the threshold for the number of long-period reserved resources is configured or pre-configured as $TH_m$, while $N_m$ and $TH_m$ correspond to each other; sensing UE determines $T_W$ by comparing a number of reserved resources in the sensing long period and $TH_m$.

26. The power-saving NR sidelink transmission and reception method according to claim 24, wherein for a plurality of resource pools, a specific sensing cycle is configured for use by the plurality of resource pools; the partial sensing window of $T_W$ is determined by a minimum cycle length $T_{MIN}$ and a maximum cycle length $T_{MAX}$ configured in the plurality of resource pools.

27. The power-saving NR sidelink transmission and reception method according to claim 1, wherein the method further comprises: for reserved non-periodic resources, Tx-UE performs channel sensing in one or a combination of more of the following ways:

a second partial sensing mechanism, comprising: after TB arrives, Tx-UE starting a timer drx-SensingTimer, conducting channel sensing in the first 31 slots before On-Duration in DRX mode for subsequent resource selection, and then Tx-UE continuing sensing until initial TB or retransmission TB is successfully received or the timer drx-SensingTimer expires;

a full sensing mechanism, comprising: if PDB is less than 32 slots, Tx-UE not closing a sensing sidelink RF, starting sensing before 32 slots of the first On-Duration after the first TB arrives, and stopping sensing in a slot wherein the last TB is successfully transmitted;

a random resource selection mechanism, comprising: for Tx-UE with high power saving requirements, the Tx-UE reporting all candidate resources within selection windows to MAC, without comprising a resource exclusion process.

\* \* \* \* \*